United States Patent
Goff et al.

(10) Patent No.: US 11,728,592 B2
(45) Date of Patent: Aug. 15, 2023

(54) MODULAR SERVICE INTERFACE

(71) Applicant: Altius Space Machines Inc., Broomfield, CO (US)

(72) Inventors: Jonathan Andrew Goff, Lafayette, CO (US); Joshua Charles Nelson, Broomfield, CO (US); Andreas Jochum, Randolph, VT (US)

(73) Assignee: Altius Space Machines, Broomfield, CO (US)

( * ) Notice: Subject to any disclaimer, the term of this patent is extended or adjusted under 35 U.S.C. 154(b) by 433 days.

(21) Appl. No.: 16/513,035

(22) Filed: Jul. 16, 2019

(65) Prior Publication Data
US 2019/0341721 A1 Nov. 7, 2019

Related U.S. Application Data

(60) Provisional application No. 62/849,204, filed on May 17, 2019, provisional application No. 62/698,479, filed on Jul. 16, 2018.

(51) Int. Cl.
| | | |
|---|---|---|
| *H01R 13/62* | (2006.01) | |
| *B64G 1/64* | (2006.01) | |
| *H01F 7/02* | (2006.01) | |
| *H01R 43/26* | (2006.01) | |
| *H01R 13/00* | (2006.01) | |
| *H01R 13/631* | (2006.01) | |

(52) U.S. Cl.
CPC .......... *H01R 13/6205* (2013.01); *B64G 1/64* (2013.01); *H01F 7/0205* (2013.01); *H01R 13/005* (2013.01); *H01R 13/631* (2013.01); *H01R 43/26* (2013.01)

(58) Field of Classification Search
CPC ........................ H01R 13/6205; H01R 13/005; H01R 13/631; H01R 43/26; B64G 1/64
See application file for complete search history.

(56) References Cited

U.S. PATENT DOCUMENTS

| | | |
|---|---|---|
| 4,259,876 A | 4/1981 | Belyanin et al. |
| 4,395,006 A | 7/1983 | Taylor |
| 5,145,130 A | 9/1992 | Purves |
| 5,509,707 A | 4/1996 | Schauer |

(Continued)

OTHER PUBLICATIONS

"Engineering Issues for all Major Modes of In Situ Space Debris Capture", downloaded Jul. 28, 2011 from American Institute of Aeronautics and Astronautics (AIAA), AIAA 2010-8863, http://sfx.galib.uga.edu/sfx_qit1?url_ver=Z39.88-2004&ctx, Authors M.H. Kaplan, B. Boone, R. Brown, T.B. Criss, E. W. Tunstel, 21 pages.

(Continued)

*Primary Examiner* — Abdullah A Riyami
*Assistant Examiner* — Nader J Alhawamdeh
(74) *Attorney, Agent, or Firm* — Thomas J. Lavan

(57) ABSTRACT

A modular service interface is provided. The modular service interface includes separable first and second halves, one or more alignment features, a connector interface and one or more electropermanent magnet modules, connector interface configured to mate the first and second halves when activated and allow the first and second halves to be separated when inactivated. The modular service interface includes no mechanical actuators to retain the first half to the second half.

20 Claims, 18 Drawing Sheets

Servicing Spacecraft Object Capture

(56) References Cited

U.S. PATENT DOCUMENTS

| | | | | |
|---|---|---|---|---|
| 6,644,637 | B1* | 11/2003 | Shen | B25B 5/061 |
| | | | | 269/152 |
| 7,479,198 | B2 | 1/2009 | Guffrey et al. | |
| 7,551,419 | B2 | 6/2009 | Pelrine et al. | |
| 7,773,363 | B2 | 8/2010 | Pelrine et al. | |
| 8,967,548 | B2* | 3/2015 | Goff | B64G 1/222 |
| | | | | 244/172.4 |
| 10,585,846 | B2* | 3/2020 | Wang | G06F 1/1698 |
| 2003/0229420 | A1 | 12/2003 | Buckingham et al. | |
| 2006/0051987 | A1* | 3/2006 | Goodman | H01R 12/714 |
| | | | | 439/74 |
| 2006/0237126 | A1 | 10/2006 | Guffrey et al. | |
| 2007/0063375 | A1 | 3/2007 | Tuma | |
| 2008/0169003 | A1 | 7/2008 | Curtis | |
| 2008/0237400 | A1 | 10/2008 | Gryniewski et al. | |
| 2012/0178270 | A1* | 7/2012 | McElroy | H01R 13/6205 |
| | | | | 439/39 |
| 2019/0241286 | A1* | 8/2019 | Goff | B25J 15/0226 |
| 2019/0278102 | A1* | 9/2019 | Suter | G02B 27/646 |
| 2019/0341721 | A1* | 11/2019 | Goff | B64G 1/64 |
| 2021/0284363 | A1* | 9/2021 | Licciardello | B64G 1/646 |

OTHER PUBLICATIONS

Tilted Janus polymer pillars, Myoung-Woon Moon, Tae-GonCha, Kwang-Ryeol Lee, Ashkan Vaziri, and Ho-Young Kim, www.rsc.org/softmatter, accepted Apr. 28, 2010.

Smooth vertical surface climbing with directional adhesion, Sangbae Kim, Matthew Spenko, Salomon Trujillo, Barrett Heyneman, Daniel Santos, Mark R. Cutkosky, IEEE Transactions on robotics, vol. 24 Number 1, Feb. 2008.

Directional adhesion for climbing: theoretical and practical considerations, Daniel Santos, Matthew Spenko, Aaron Pamrness, Sangbae Kim, and Mark R. Cutkosky, Center for design and research, Stanford University, Stanford, California, 94305-2232.

Climbing rough vertical surfaces with hierarchical directional adhesion, Alan Asbeck, Sanjay Dastoor, Aaron Parness, Laurel Fullerton, Noe Esparza, Daniel Soto, Barrett Heyneman, Mark Cutkosky, Stanford University, Stanford, California, 94305.

Hierarchically branched Gecko-like structures imprinted using porous alumina templates, A. Y. Y. Ho, I. Rodriguez, Y. C. Lam, Institute of materials research and engineering, Agency for Science, Technology and research (A*STAR), 3 Research Link, Singapore 117602, School of mechanical and aerospace engineering, Nanyang technological university, NSTI-Nanotech 2010, www.nsti.org, ISBN 978-1-4398-3402-2 vol. 2, 2010.

Flexible carbon-nanofiber connectors with Anisotropic adhesion properties, Hyunhyub Ko, Zhenxing Zhang, Johnny C. Ho, Kuniharu Takei, Rehan Kapadia, Yu-Lun Chueh, Weizhen Cao, Brett A. Gruden, Ali Javey, Wiley Interscience, www.small-journal.com, Small 2009, Oct. 2, 2009, 2009 Wiley-VCH Verlag GmBH & Co., KGaA, Weinheim.

Hybrid core-multishell nanowire forests for electrical connector applications, Rehan Kapadia, Hyunhyub Ko, Yu-Lun Chueh, Johnny C. Ho, Toshitake Takahashi, Zhenxing Zhang, Ali Javey, Department of electrical engineering and computer sciences, University of California at Berkeley, Published Jul. 1, 2009, Applied Physics Letters 94, 263110 (2009), 2009 American Institute of Physics.

Wet and dry adhesion properties of self-selective nanowire connectors, Hyunhyub Ko, Zhenxing Zhang, Yu-Lun Chueh, Johnny C. Ho, Jongho Lee, Ronald S. Fearing, Ali Javey, Advanced functional Materials 2009, Published Aug. 25, 2009, 19, 3098-3 102, www.afm-journal.de, Wiley Interscience, 2009 Wiley-VCH Verlag GmBH & Co, KGaA, Weinheim.

Wikipedia "Lagrangian Point", http://en.wikipedia.org/wiki/Lagrangian_point, downloaded Nov. 20, 2012.

* cited by examiner

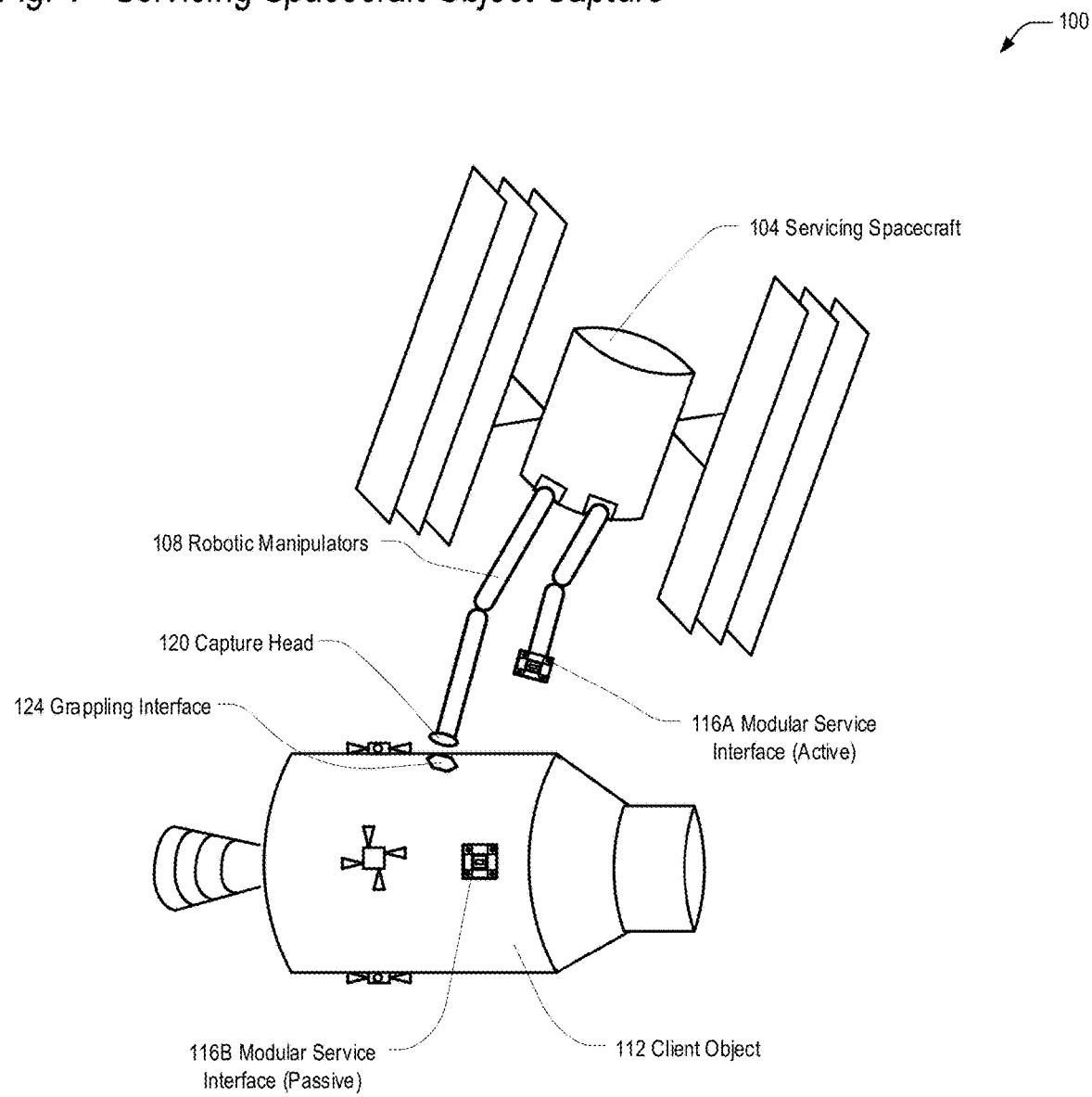
Fig. 1 Servicing Spacecraft Object Capture

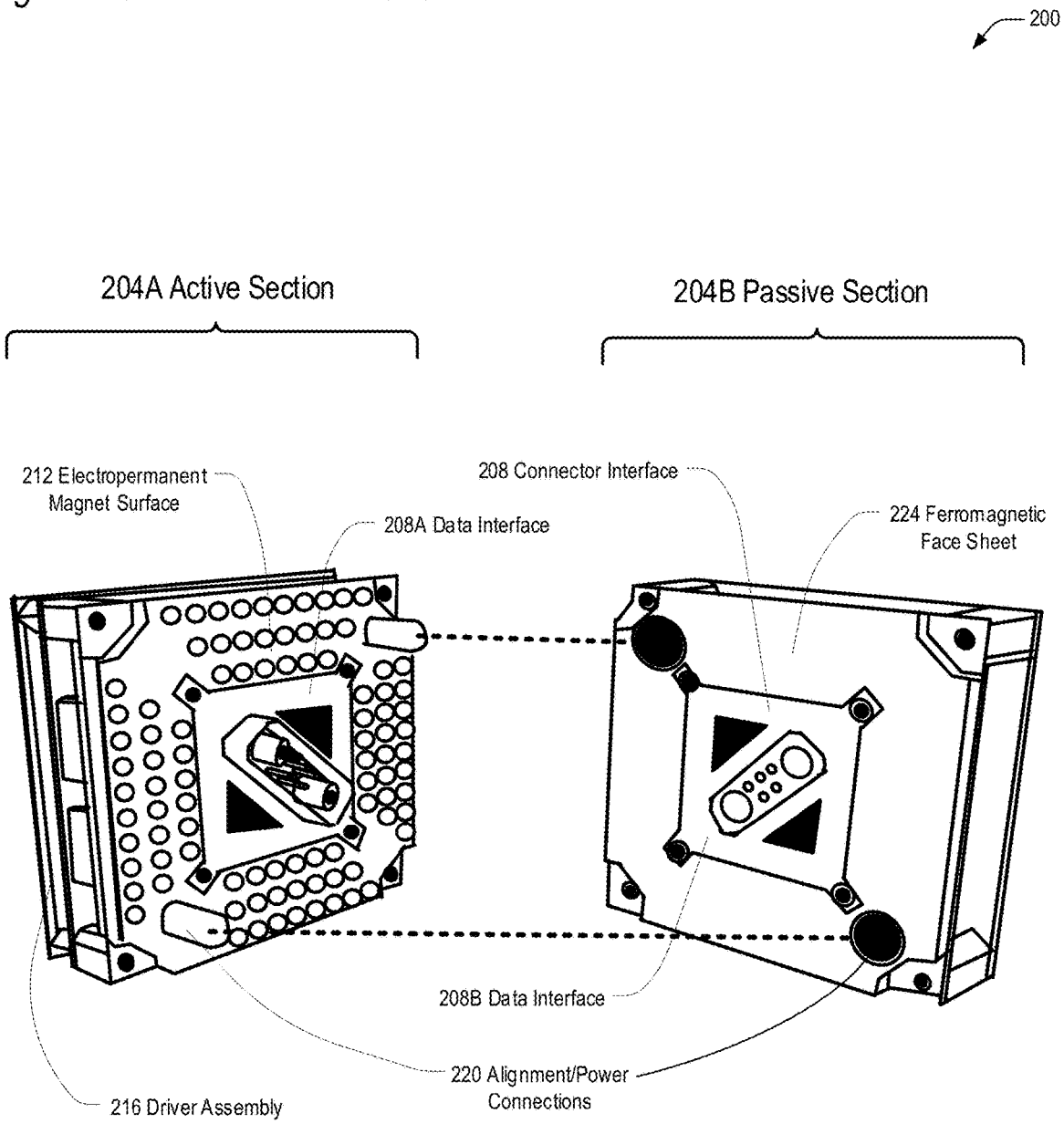
Fig. 2 Modular Service Interface

*Fig. 3A Modular Service Interface Active Section*
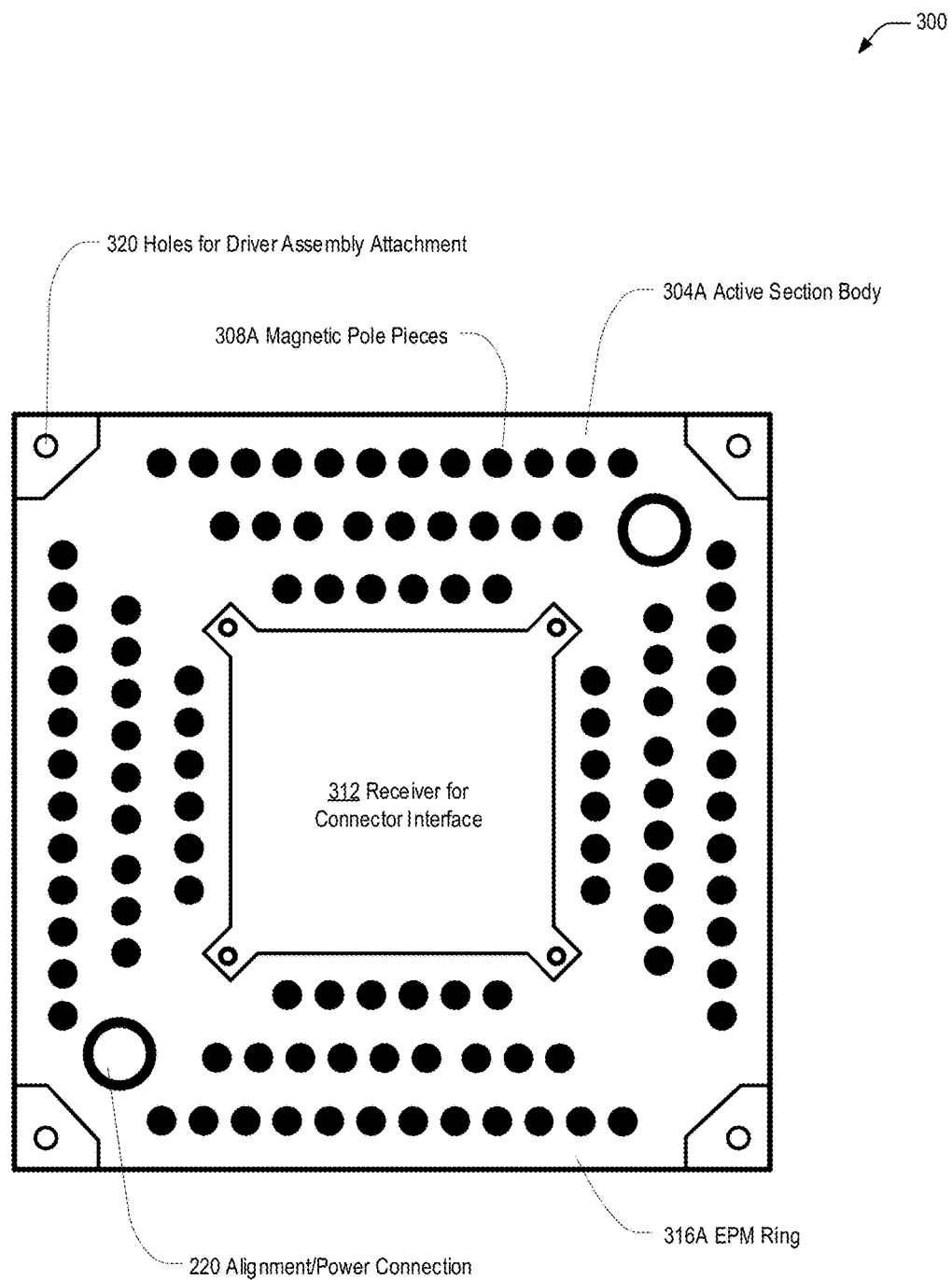

*Fig. 3B Modular Service Interface Active Section*
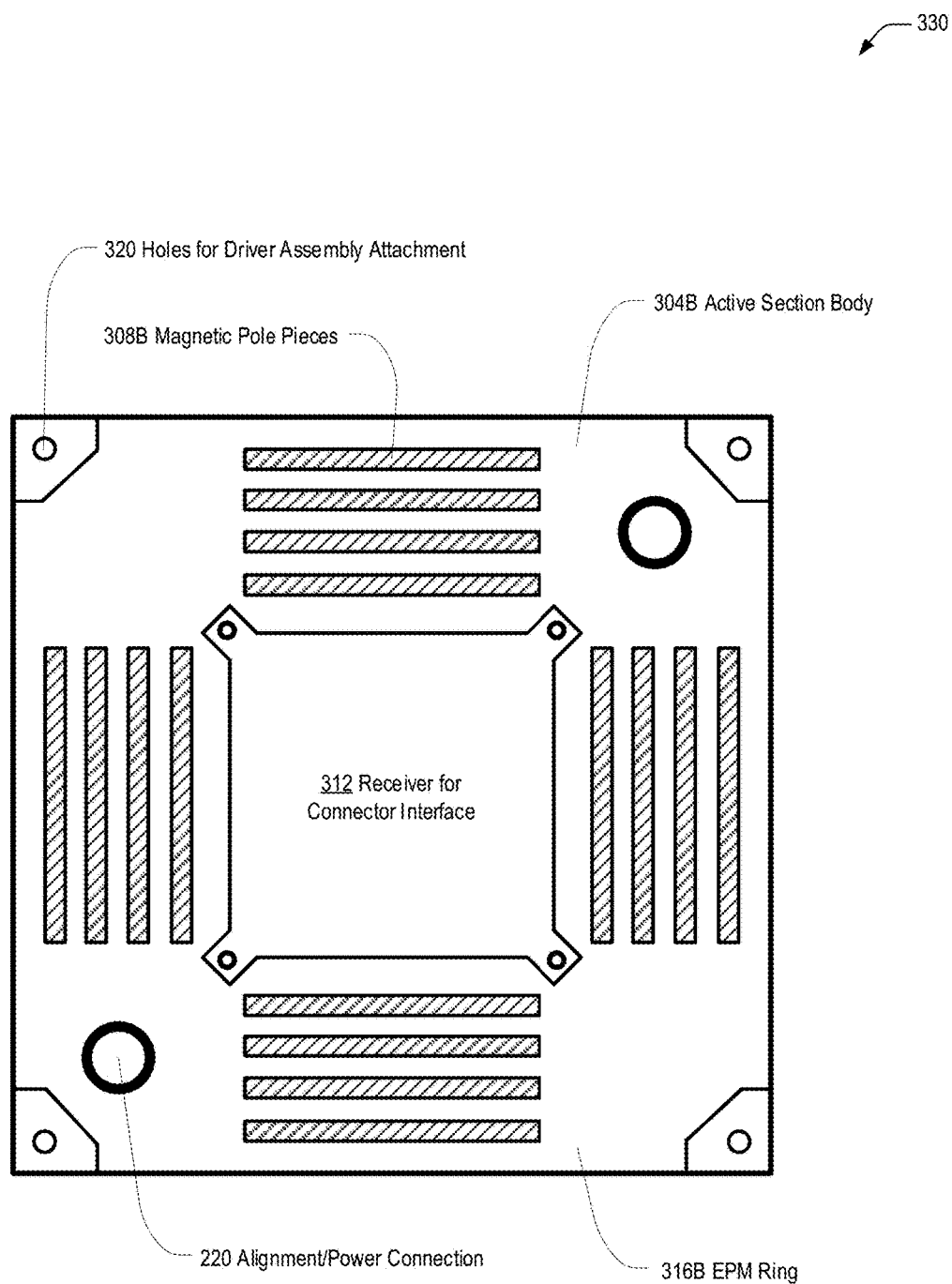

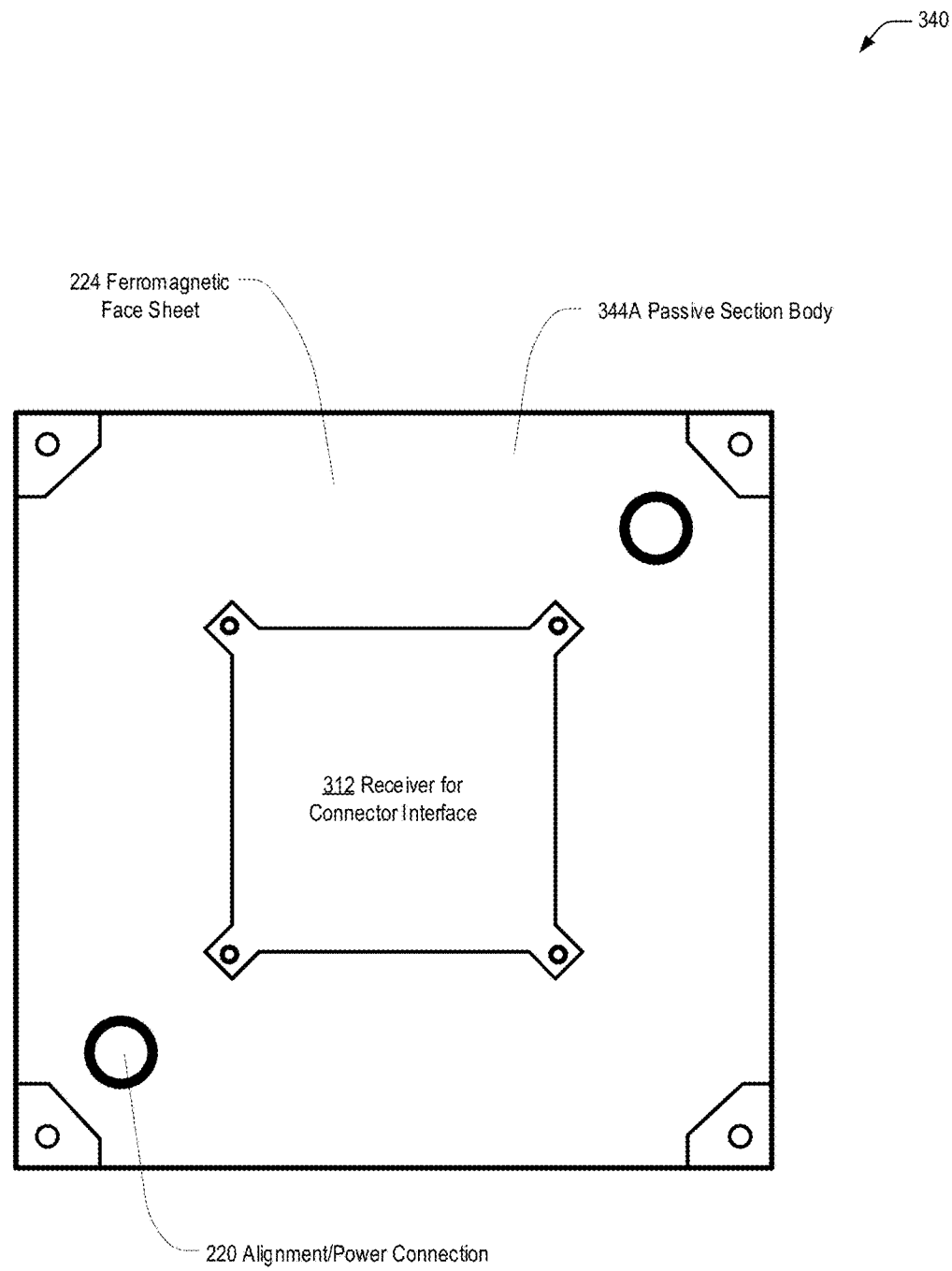
Fig. 3C Modular Service Interface Passive Section

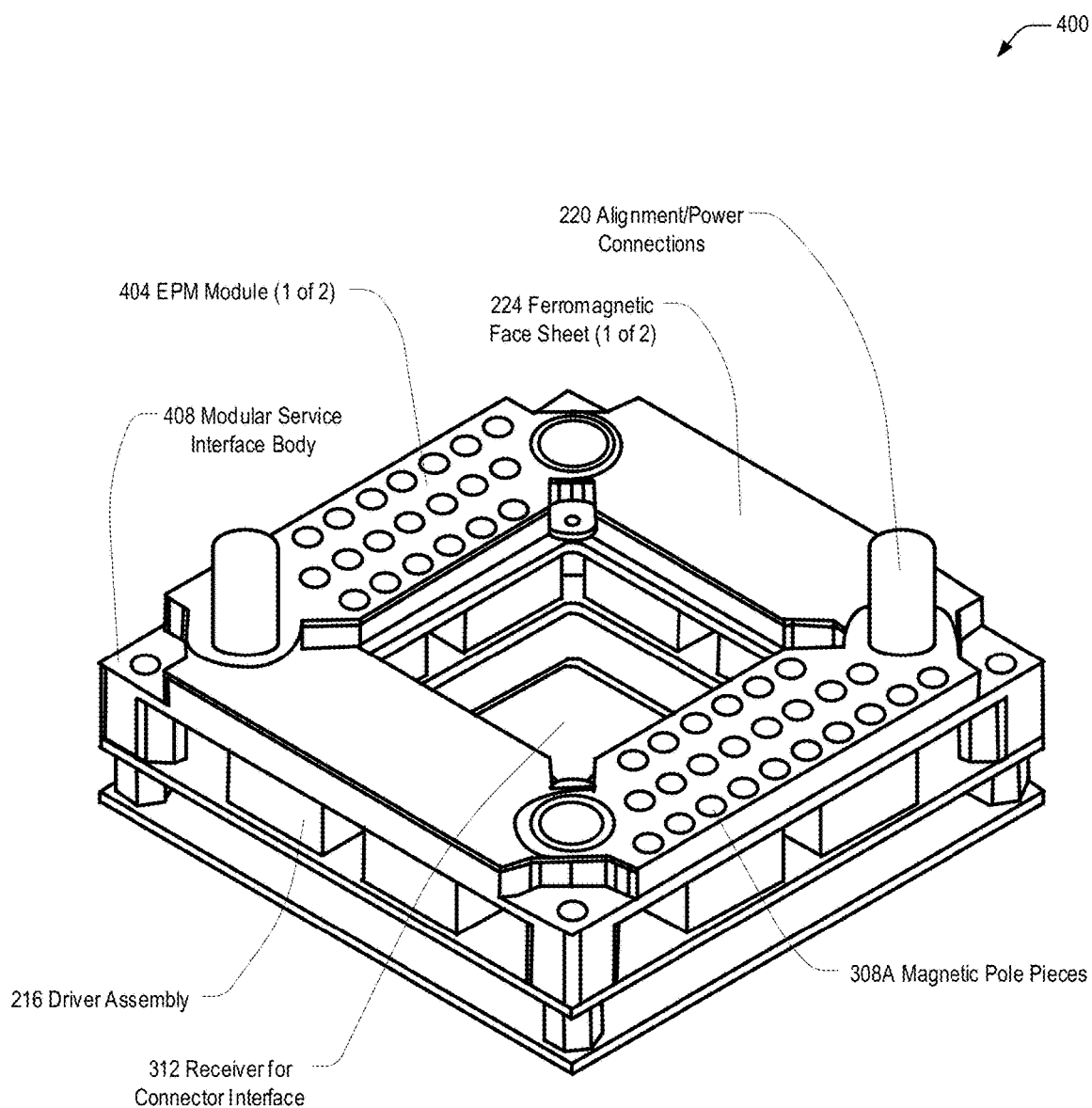
Fig. 4 Modular Service Interface

Fig. 5 Modular Service Interface
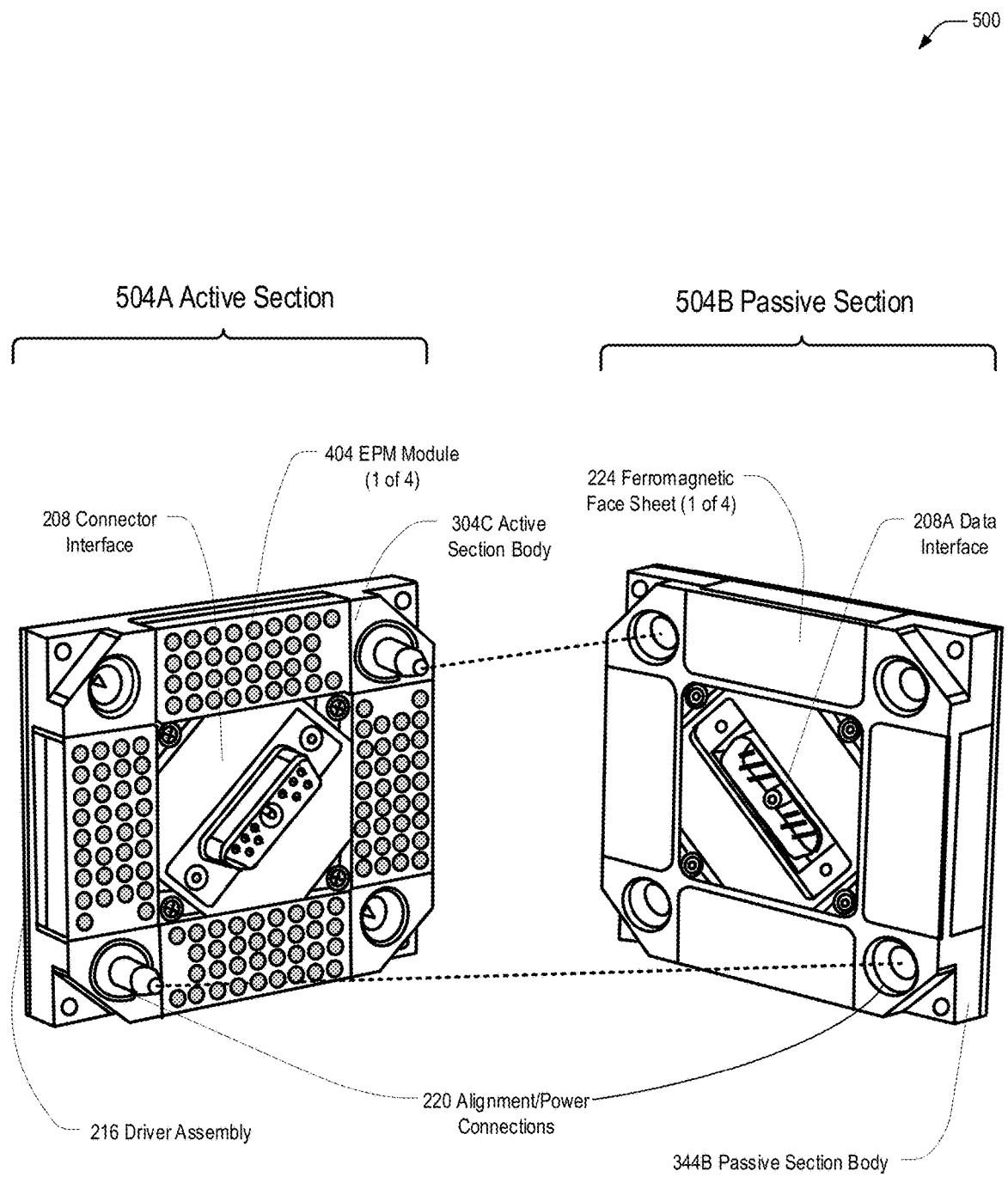

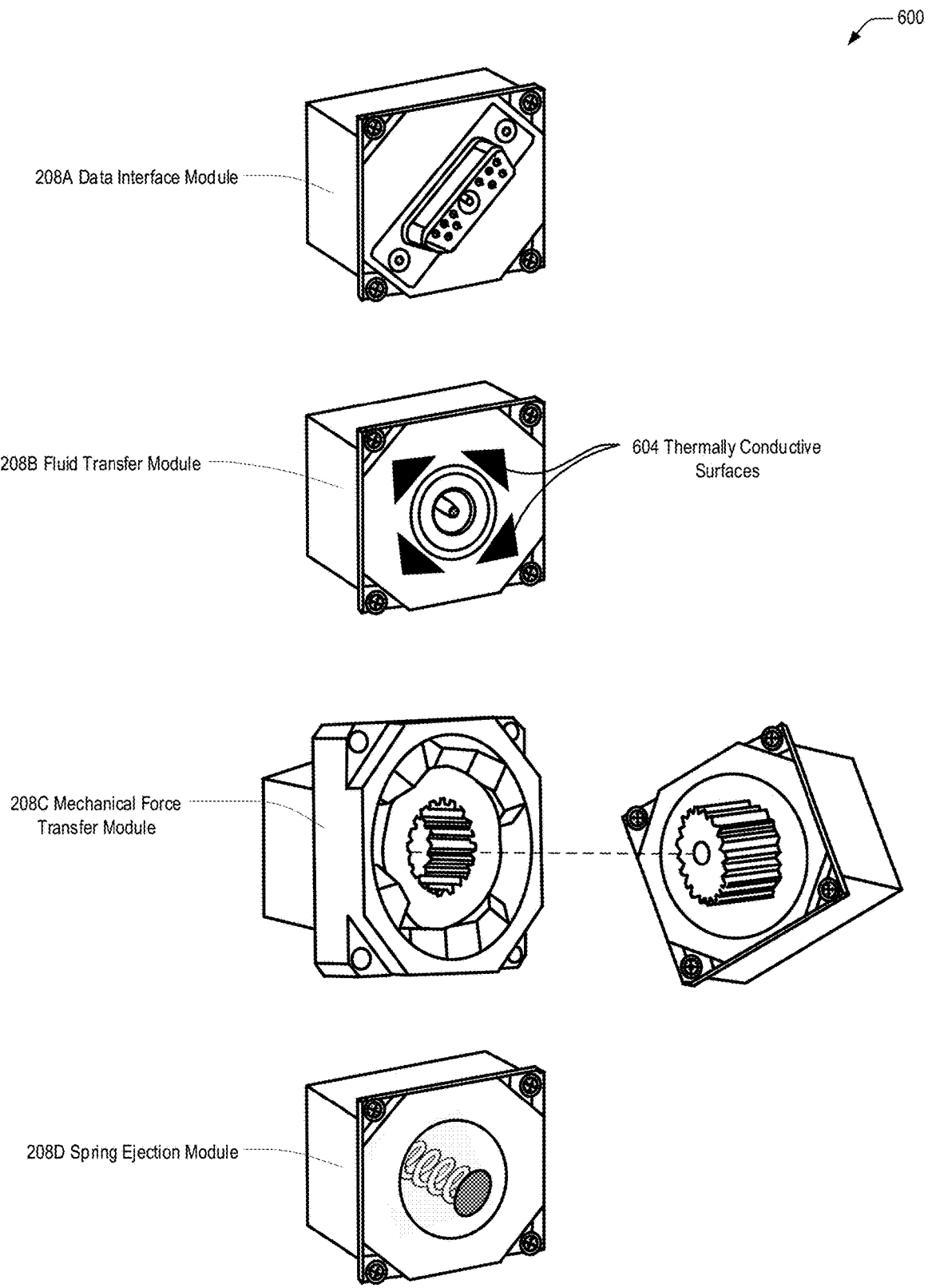
Fig. 6 Connector Interface Options

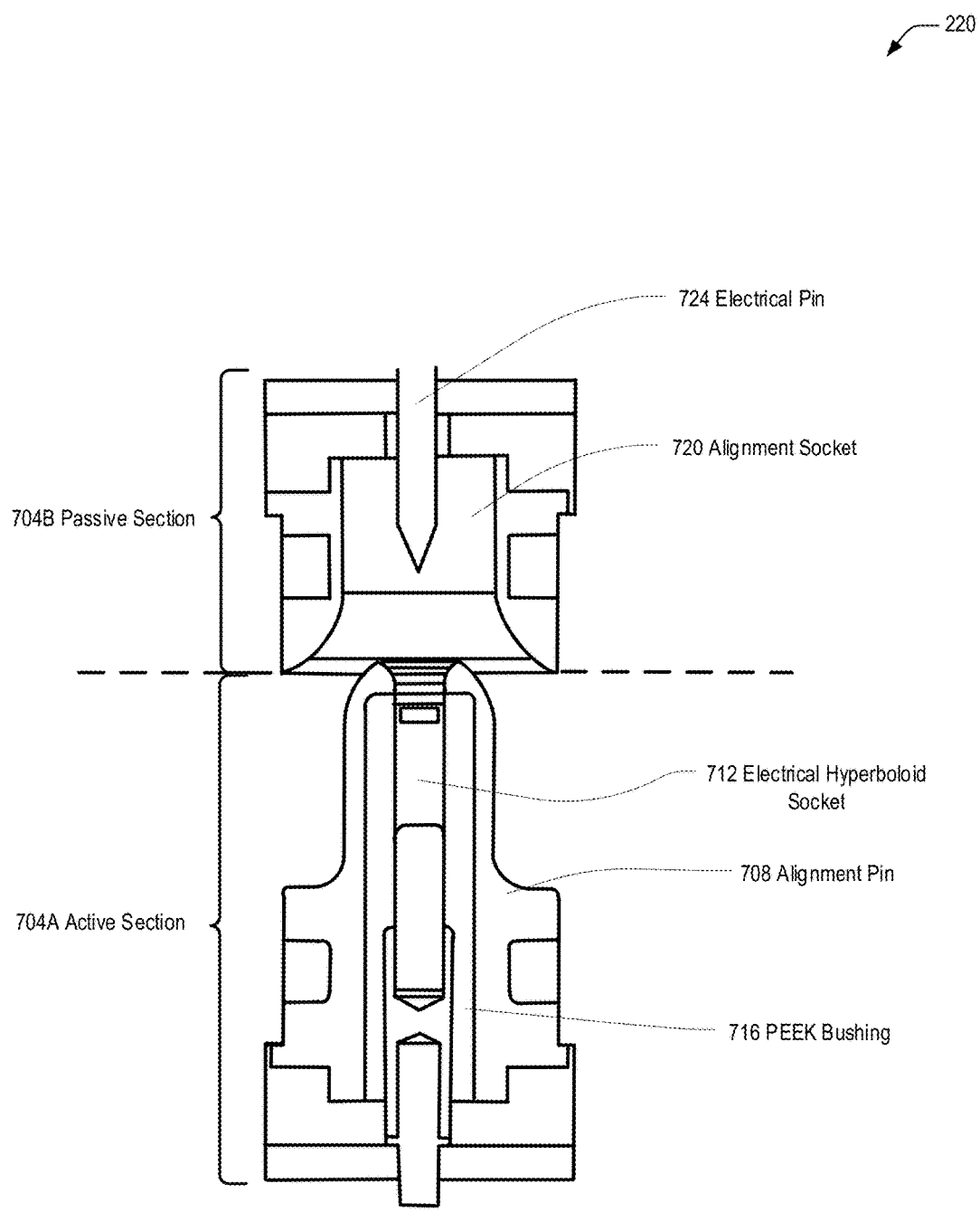
Fig. 7 Alignment and Power Connections

Fig. 8A  Magnet/Coil Array
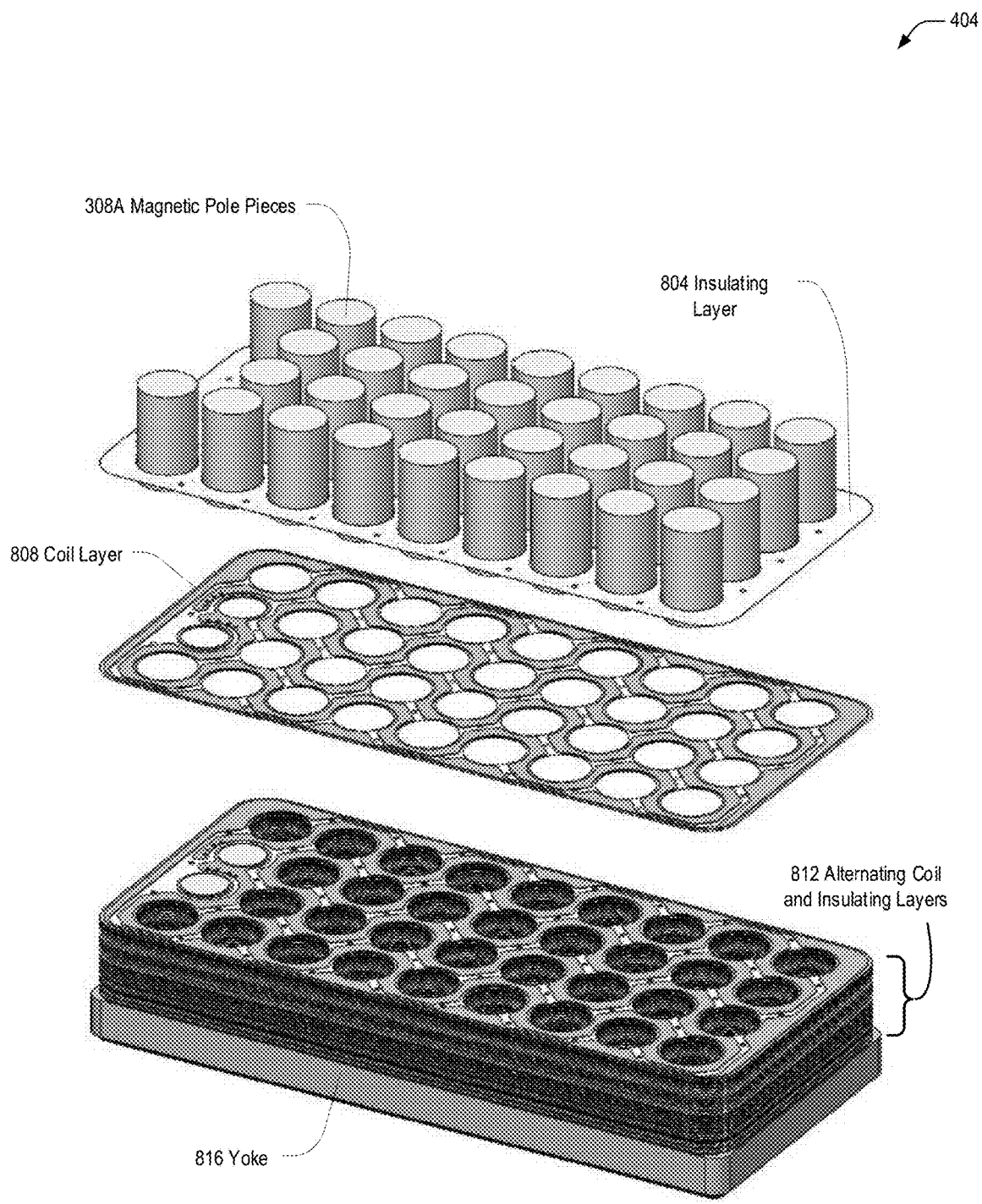

*Fig. 8B Coil Layer Detail*
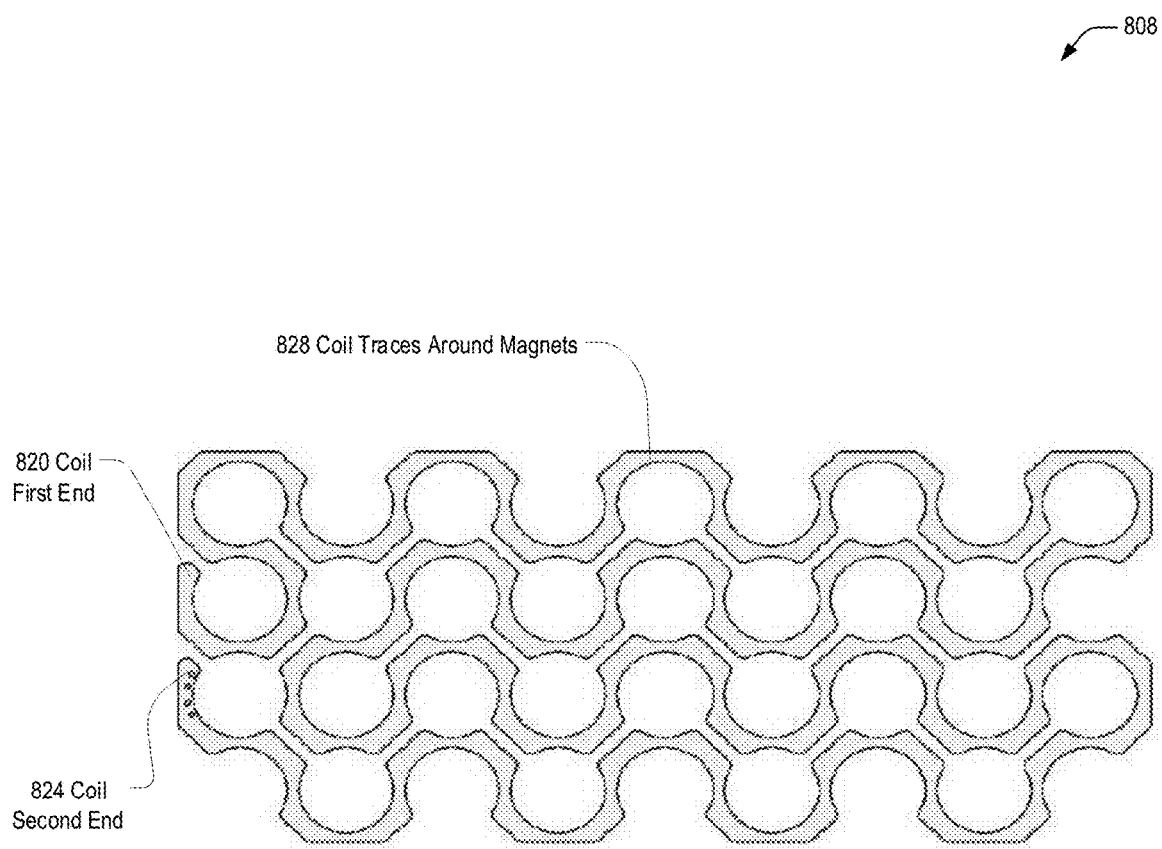

*Fig. 9A Magnetic Flux Diagram For Close Range Attraction*
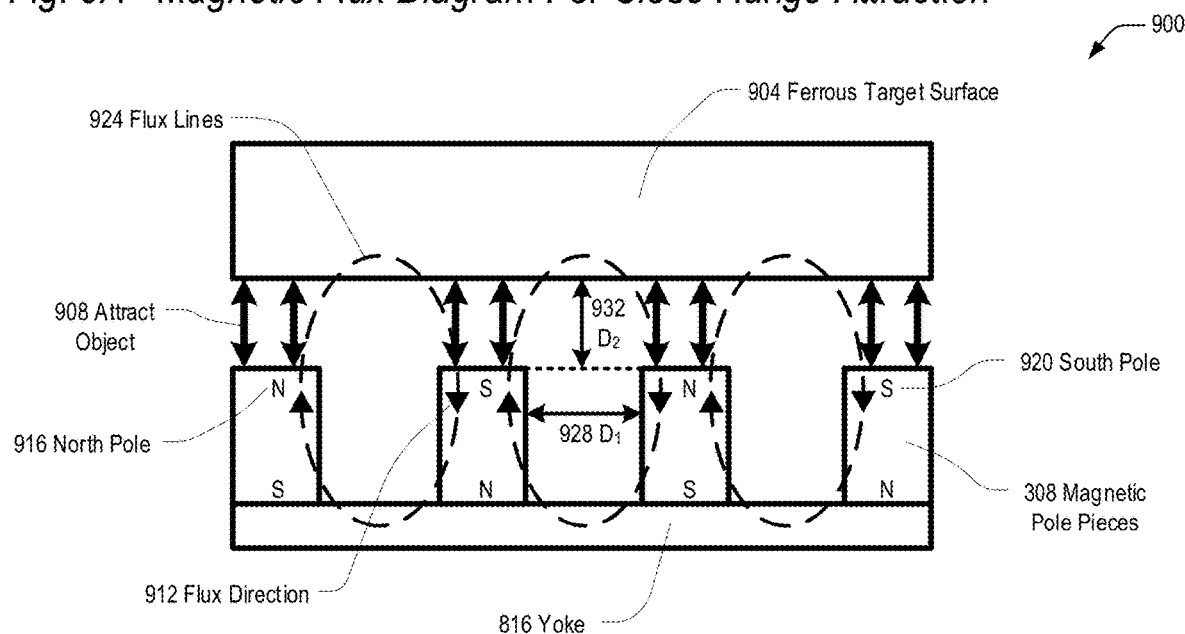
*Fig. 9B Magnetic Flux Diagram For Close Range Attraction*
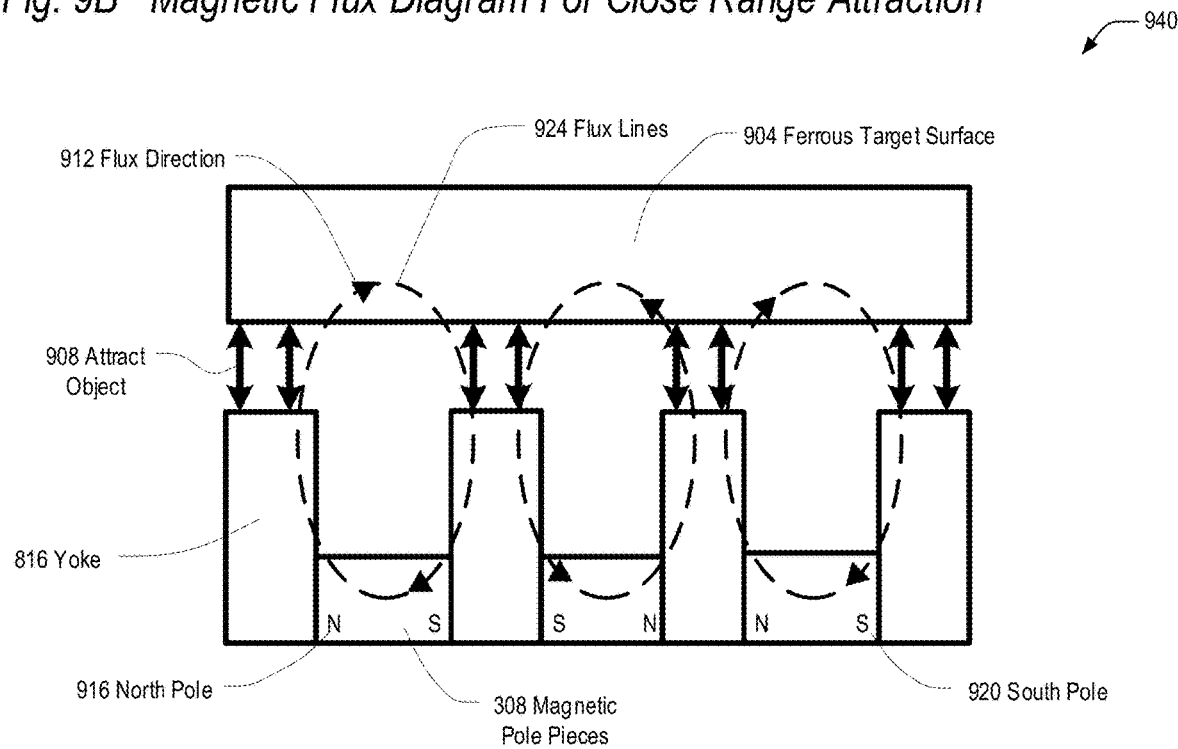

*Fig. 10A Block Diagram*
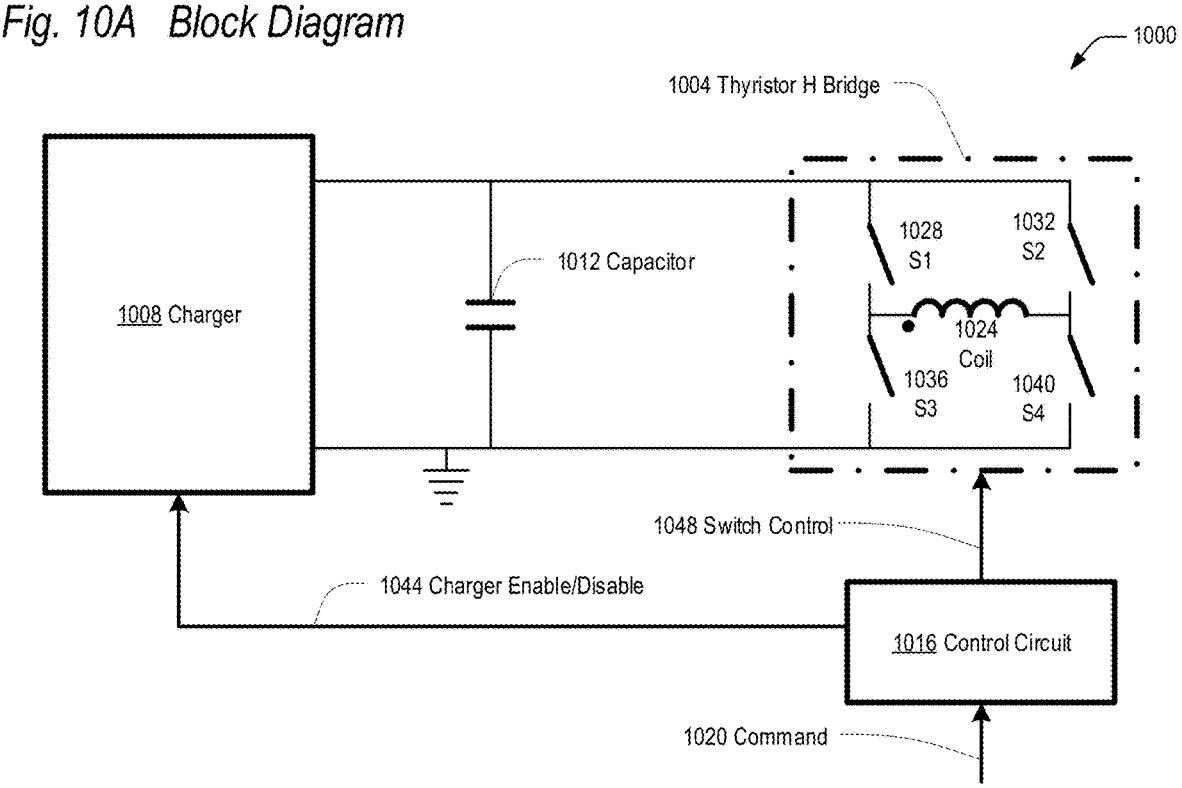
*Fig. 10B Charging Phase*
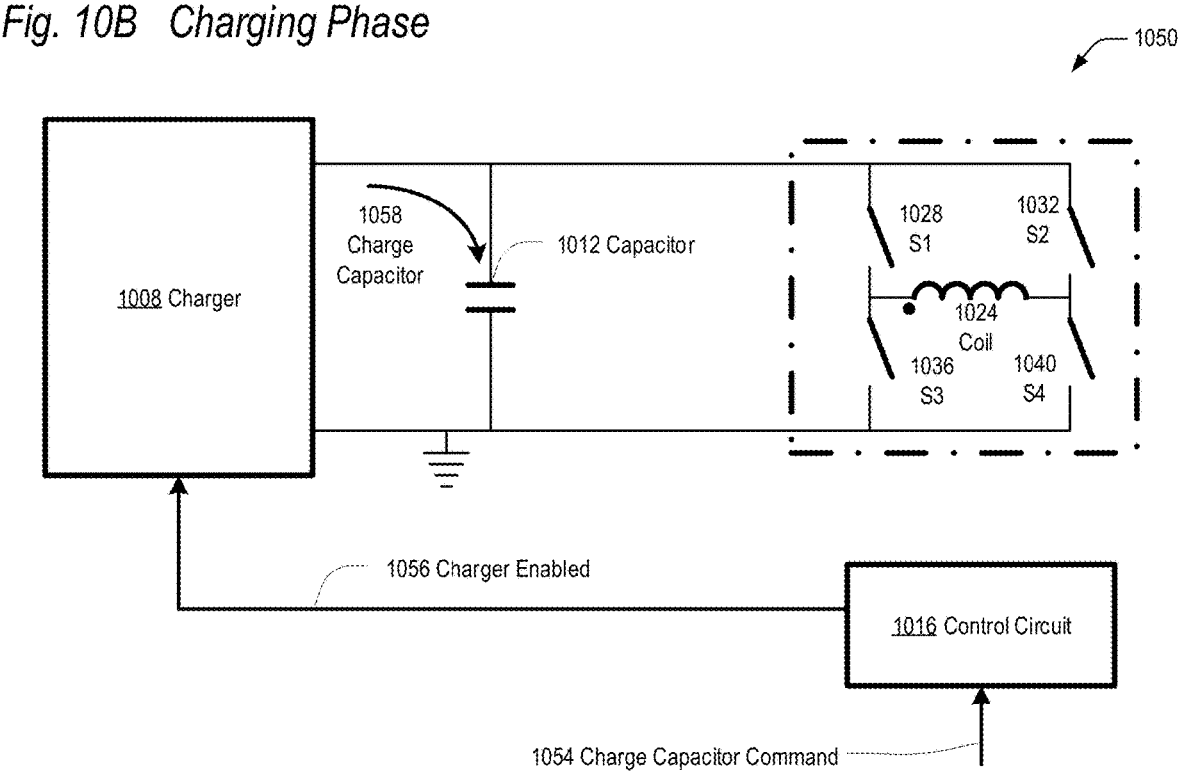

*Fig. 10C  Discharging Phase through Forward Coil*
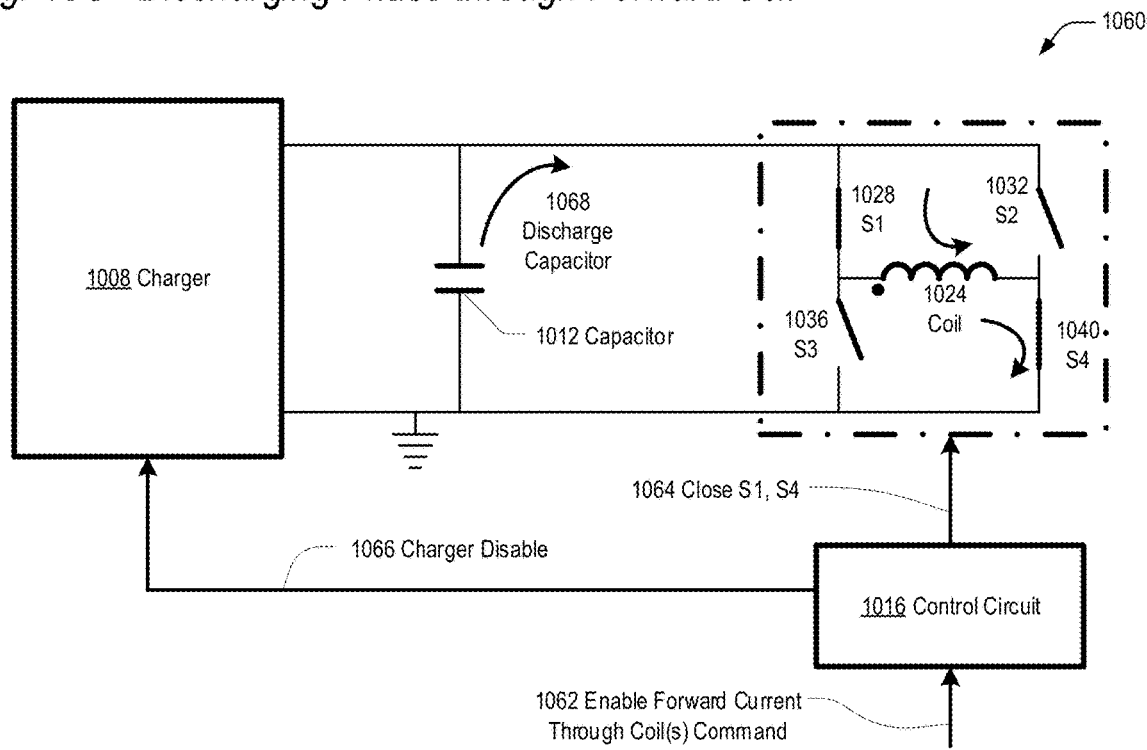
*Fig. 10D  Discharging Phase through Reverse Coil*
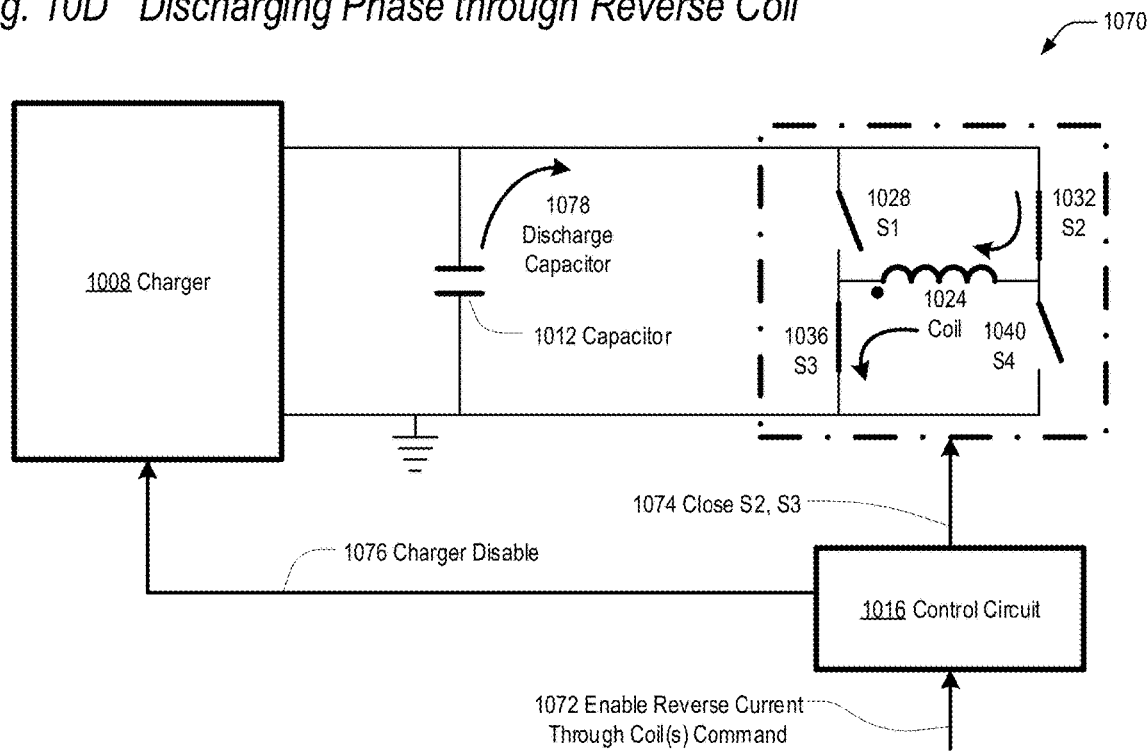

*Fig. 10E  Block Diagram With Multiple Coils*
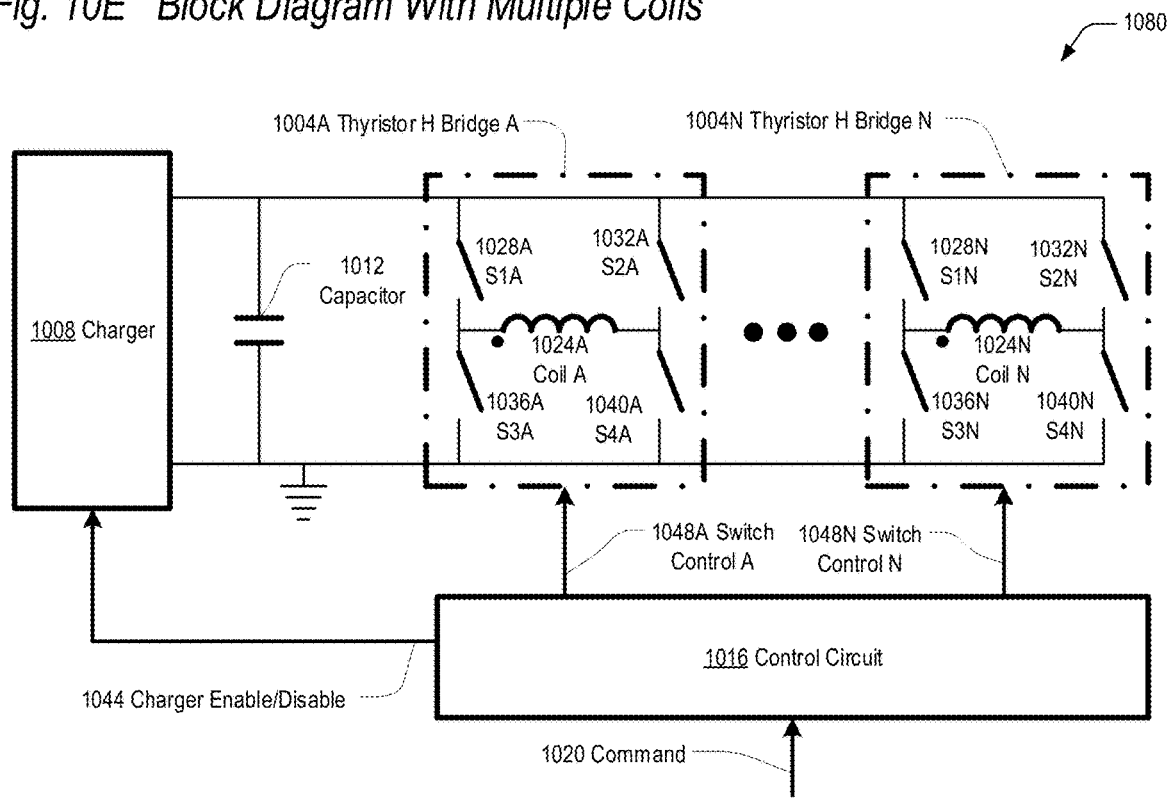
*Fig. 10F  Block Diagram With Multiple Coils*
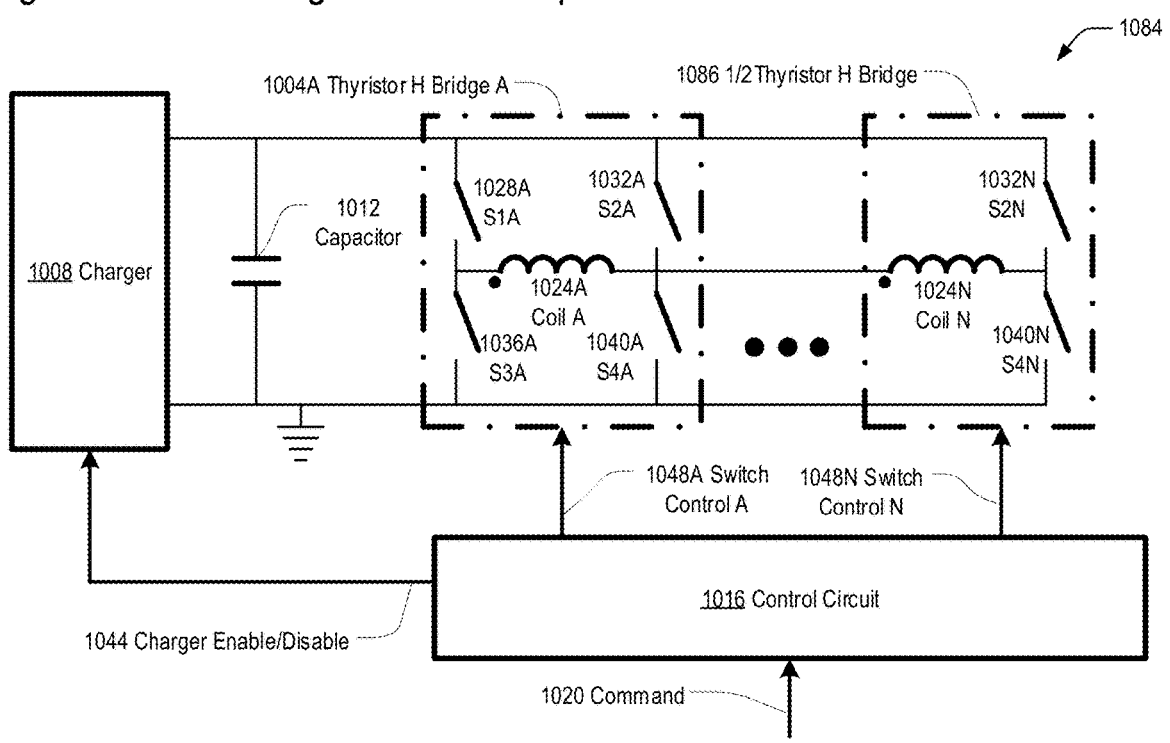

Fig. 11A  Flux Direction in Single Coil
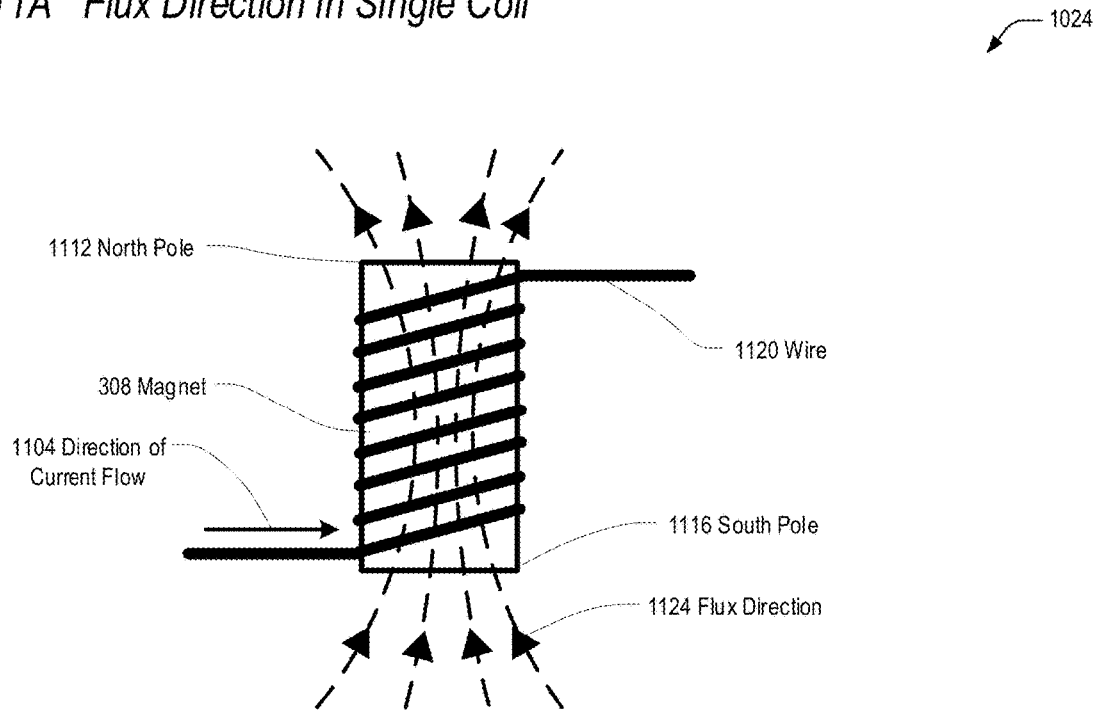
Fig. 11B  Flux Direction in Dual Coil
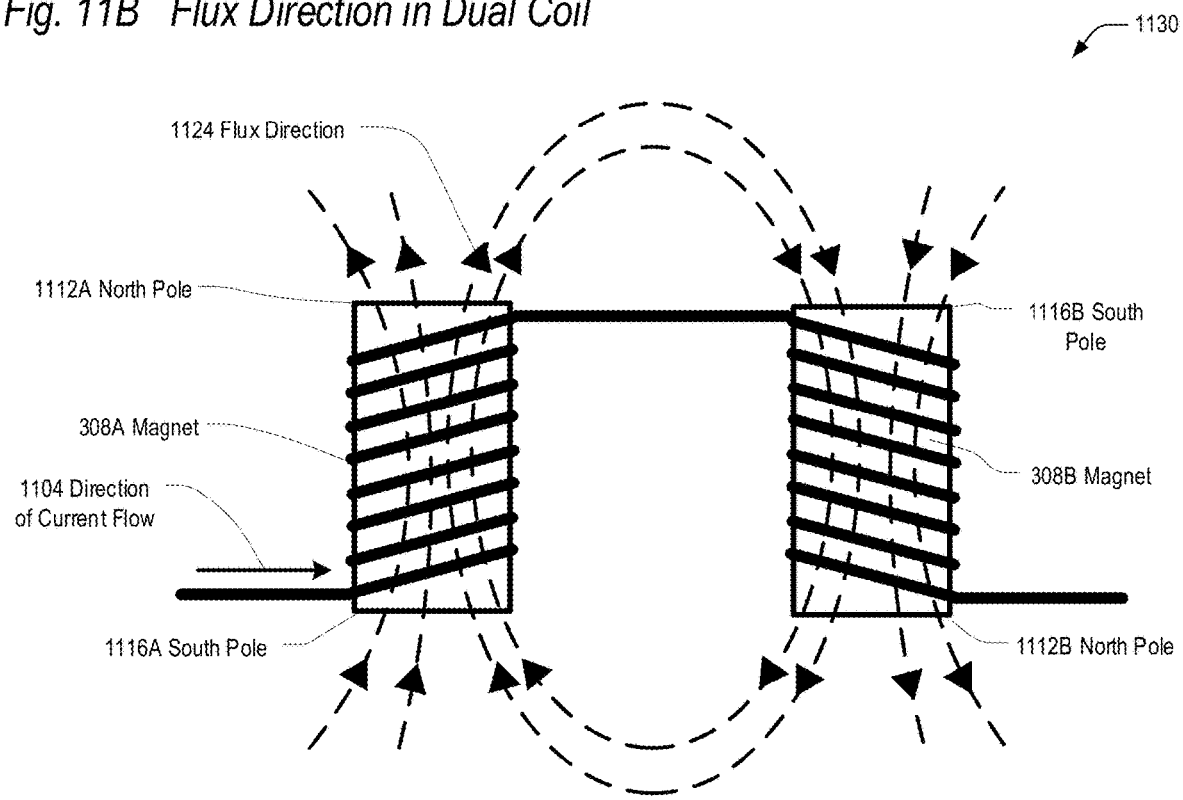

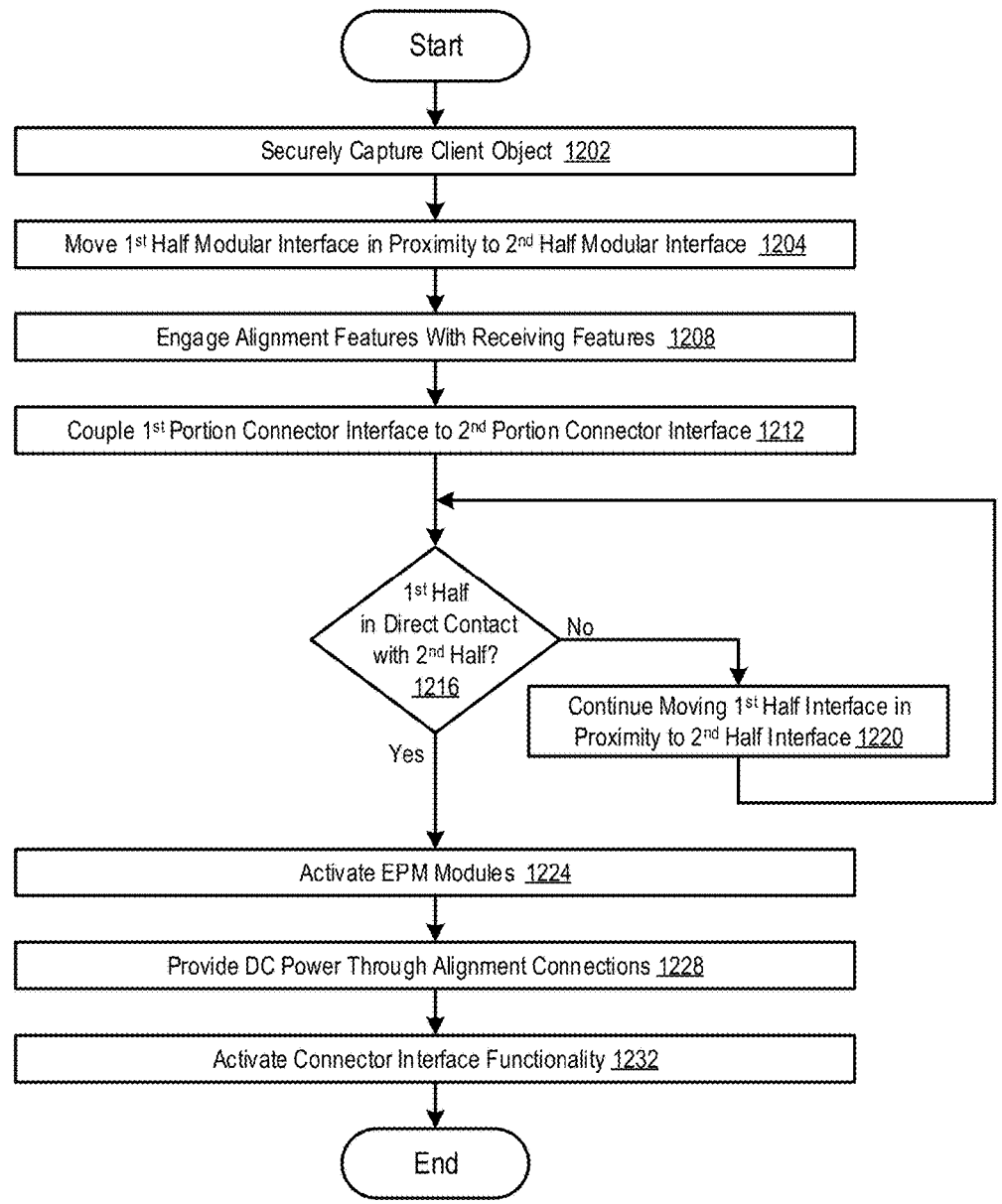
Fig. 12 Modular Interface Service Process

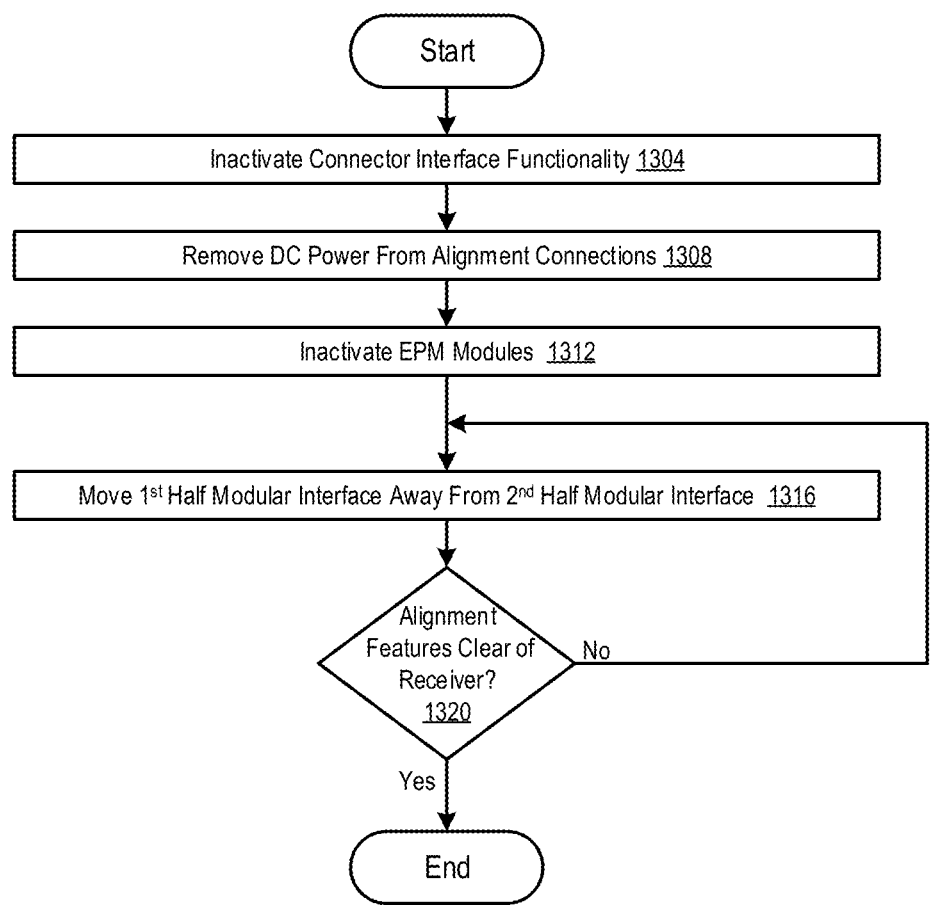
Fig. 13 Modular Interface Separation Process

MODULAR SERVICE INTERFACE

CROSS REFERENCE TO RELATED APPLICATIONS

This application claims priority from Provisional U.S. application 62/698,479, filed Jul. 16, 2018, entitled MODULAR SATELLITE INTERFACE, which is hereby incorporated by reference for all purposes. This application additionally claims priority from Provisional U.S. application 62/849,204, filed May 17, 2019, entitled ELECTROPERMANENT MAGNET, which is hereby incorporated by reference for all purposes.

FIELD

The present invention is directed to cooperative object servicing and manipulation. In particular, the present invention is directed to methods and apparatuses for providing by providing modular robotic servicing interfaces for spacecraft, robotic manipulators and end effectors, and payloads.

BACKGROUND

Spacecraft can recover objects in space using one or more robotic arms. When the process involves recovering a delivery vehicle, it is typically called "berthing". Using a robot arm to recover a delivery vehicle and gently attach it to a space facility enables the use of lighter vehicle-to-vehicle connection mechanisms than is possible with traditional "docking" maneuvers, where the delivery vehicle directly connects with the spacecraft. In a scenario where a client satellite is beyond direct human vision, a grasping satellite or tug must be under the full control of a ground-based control center or have some fully or semi-autonomous control because the distance and communications delays typically prevent a directly human operated capture system. To grapple or capture a client satellite beyond direct vision, a system must exist for the grasping satellite to locate the client satellite, maneuver to the vicinity of the target, observe the client satellite, match any rotation that the client satellite may have, reach out with a robotic arm, grasp the client satellite, arrest its motion, and secure it to the tug.

Robotic arms have been in existence for several decades. Many industries utilize robotic arms to speed production, improve product assembly quality, and manipulate hazardous objects and materials. Most robotic arms in the world are designed for heavy, repetitive manufacturing work, and handle tasks that are difficult, dangerous, or boring to human beings. A typical robotic arm is controlled by a computer by activating individual stepper motors or actuators connected at each joint. At a minimum, a robotic arm has a single segment and a joint at each end. Robotic arms often use motion sensors to regulate movement in precise increments.

Current technology robotic arms utilize capture heads incorporating mechanical grippers, where mechanical force between two or more surfaces are used to positively capture and move objects. Mechanical grippers are suitable to capture known objects of predictable size, shape, and orientation, and having robust attachment surfaces.

SUMMARY

The present invention is directed to solving disadvantages of the prior art. In accordance with embodiments of the present invention, a modular service interface is provided. The modular service interface includes separable first and second halves, one or more alignment features, a connector interface, and one or more electropermanent magnet modules, configured to mate the first and second halves when activated and allow the first and second halves to be separated when inactivated. The modular service interface includes no mechanical actuators to retain the first half to the second half.

In accordance with another embodiment of the present invention, a method is provided. The method includes one or more of moving a first half of a modular service interface toward a second half of the modular service interface, engaging alignment features with corresponding receiving features, coupling a first portion connector interface to a second portion connector interface, observing the first half and second half of the modular service interface in direct contact, and activating the one or more electropermanent magnet modules to mate the first and second halves. The modular service interface includes one or more alignment features and corresponding receiving features, a connector interface, and one or more electropermanent magnet modules configured to mate the first and second halves when activated and allow the first and second halves to be separated when inactivated. The connector interface includes a first portion connector interface in the first half and a second portion connector interface in the second half.

In accordance with yet another embodiment of the present invention, a modular service interface is provided. The modular service interface includes one or more of a passive section and an active section. The passive section includes one or more of a plurality of alignment receivers, a receiver for a centrally-disposed first portion of a connector interface, and one or more ferromagnetic face sheet sections. The active section is configured to selectively mate and unmate with the passive section, and includes one or more of a plurality of alignment posts, a receiver for a centrally-disposed second portion of the connector interface, and one or more electropermanent magnet modules. The plurality of alignment posts extend away from opposite edges of the active section in a parallel fashion and are configured to provide power and ground connections to the plurality of alignment receivers. The second portion of the connector interface is configured to mate with the first portion as the passive section mates with the active section. The one or more electropermanent magnet modules each include a plurality of solid state switchable magnets, disposed peripherally around the connector interface, and configured to mate the active and passive sections when activated. When activated, the one or more electropermanent magnet modules are further configured to mate the active and passive sections when activated and allow the active and passive sections to be separated when inactivated.

An advantage of the present invention is that it provides a standard compact service interface for various types of client objects. The client objects include, but are not limited to, any type of spacecraft, satellite, or stores or provisions. A standard service interface makes it easier for competing hardware developers to create modules that can be used to repair or upgrade client objects, and for customers to develop payloads that could be hosted by a client spacecraft using the interface to attach the payload to the client object.

Another advantage of the present invention is it provides a highly configurable modular interface suited to a wide array of general customer needs and allows for development of specialized interfaces for specific payload and sub-assembly requirements.

Another advantage of the present invention is it provides interfaces usable for full subassembly interfaces for satellites or component level interfaces to larger subassemblies. The general concept may potentially be scaled up to supporting larger modules.

Another advantage of the present invention is it provides electropermanent magnetic attraction, which offers a bi-stable latching mechanical connection with no moving parts. Moving parts are some of the highest risk items on a spacecraft, and eliminating them can remove many potential failure modes. Magnetic coupling reduces strain due to thermal conditions at the interface boundary.

Another advantage of the present invention is it requires little energy to operate. Electropermanent magnets only require energy to change gripping states from off-to-on and on-to-off, and advantageously can hold an attached payload or client object indefinitely without consuming extra energy.

Another advantage of the present invention is a small mass and volume footprint. Without the need for heavy mechanical connections, the overall interface architecture can be produced within a smaller footprint saving on mass and required volume. The modular service interface may occupy a typical footprint of only approximately 75 mm×75 mm with a thickness of approximately 1-2 cm.

Yet another advantage of the present invention is it is intended to be fully consumed on reentry of the earth's atmosphere. This provides a safety factor for people and property on Earth, and does not contribute to any such concerns that may be associated with a recovery object the capture interface may be affixed to.

Additional features and advantages of embodiments of the present invention will become more readily apparent from the following description, particularly when taken together with the accompanying drawings.

BRIEF DESCRIPTION OF THE DRAWINGS

FIG. 1 is a diagram illustrating a servicing spacecraft capture of a client object in accordance with embodiments of the present invention.

FIG. 2 is a diagram illustrating a modular service interface in accordance with a first embodiment of the present invention.

FIG. 3A is a diagram illustrating a modular service interface active section in accordance with the first embodiment of the present invention.

FIG. 3B is a diagram illustrating a modular service interface active section in accordance with a second embodiment of the present invention.

FIG. 3C is a diagram illustrating a modular service interface passive section in accordance with embodiments of the present invention.

FIG. 4 is a diagram illustrating a modular service interface in accordance with a third embodiment of the present invention.

FIG. 5 is a diagram illustrating a modular service interface in accordance with a fourth embodiment of the present invention.

FIG. 6 is a diagram illustrating connector interface options in accordance with embodiments of the present invention.

FIG. 7 is a diagram illustrating alignment and power connections in accordance with embodiments of the present invention.

FIG. 8A is an illustration depicting a magnet/coil array in accordance with embodiments of the present invention.

FIG. 8B is an illustration depicting coil layer detail in accordance with embodiments of the present invention.

FIG. 9A is a diagram illustrating magnetic flux for close range attraction in accordance with a first embodiment of the present invention.

FIG. 9B is a diagram illustrating magnetic flux for close range attraction in accordance with a second embodiment of the present invention.

FIG. 10A is a block diagram of an electropermanent magnet assembly in accordance with embodiments of the present invention.

FIG. 10B is a block diagram illustrating a charging phase for an electropermanent magnet assembly in accordance with embodiments of the present invention.

FIG. 10C is a block diagram illustrating a discharging phase through a forward coil for an electropermanent magnet assembly in accordance with embodiments of the present invention.

FIG. 10D is a block diagram illustrating a discharging phase through a reverse coil for an electropermanent magnet assembly in accordance with embodiments of the present invention.

FIG. 10E is a block diagram using multiple coils an electropermanent magnet assembly in accordance with a first embodiment of the present invention.

FIG. 10F is a block diagram using multiple coils an electropermanent magnet assembly in accordance with a second embodiment of the present invention.

FIG. 11A is a diagram illustrating flux direction in a single coil in accordance with embodiments of the present invention.

FIG. 11B is a diagram illustrating flux direction in dual coils in accordance with embodiments of the present invention.

FIG. 12 is a flowchart illustrating a modular interface service process in accordance with embodiments of the present invention.

FIG. 13 is a flowchart illustrating a modular interface separation process in accordance with embodiments of the present invention.

DETAILED DESCRIPTION

Currently, most spacecraft are designed to operate for years or decades at a time without any physical contact or manipulation after launch and deployment in space. There have been notable exceptions like the Hubble Space Telescope and the International Space Station that have been repaired or upgrade in-space after launch. While satellite servicing has often involved the use of astronauts and human spaceflight vehicles, recent work by several US companies and US and foreign government agencies have begun developing robotic spacecraft that can capture and service spacecraft on-orbit without requiring astronauts. These envisioned satellite servicing operations include refueling spacecraft, fixing stuck deployable structures, inspecting spacecraft, or trying to repair other damaged components. In most cases satellites are not currently designed to make servicing easier, though in some instances such as the Hubble Space Telescope or International Space Station, spacecraft have been intentionally designed in a way that enables replacing some components to repair or upgrade them.

Recent innovations in space robotics and in-space manufacturing are creating renewed interest in satellite servicing and on-orbit construction of large satellites and space facilities. In order to facilitate this transition to serviceable satellites and eventually persistent low-earth orbit (LEO) and other platforms, the need exists for simple, robust and lightweight modular service interfaces. Simple and lightweight modular service interfaces allow for a variety of functions to be expanded or upgraded at low cost using simple, affordable commercial satellite servicing vehicles. Additionally, given the large number of LEO constellations in development, such modular service interfaces provide a low cost way of restoring degraded functionality and enable constellation operators to extend the productive lifetime of their satellite assets. For instance, plug-and-play modules may be developed for replacement batteries and reaction wheels that would be able to take over or supplement those systems on the satellites which may fail prior to an expected lifetime. This method of servicing may eliminate the need to deorbit and replace satellites which otherwise may be completely functional.

The present application describes an electropermanent magnetically-coupled electrical and/or fluid connection modular service interface that is robust and lightweight. These modular interfaces will allow for enhanced serviceability and upgradability of future space assets for National Aeronautics and Space Administration (NASA), the Department of Defense (DoD), and commercial interests.

Space facilities often capture objects in space with one or more robotic arms, sometimes within direct visual distance of a robot operator. When the process involves recovering a delivery vehicle, it is typically called "berthing". Using a robot arm to recover a delivery vehicle and gently attach it to a servicing spacecraft enables the use of lighter vehicle-to-vehicle connection mechanisms than is possible with traditional "docking" maneuvers, where the delivery vehicle directly connects with the servicing spacecraft without the use of robotic manipulators.

Referring now to FIG. 1, a diagram illustrating a servicing spacecraft capture of a client object 100 in accordance with embodiments of the present invention is shown. The servicing spacecraft 104 may be a manned or unmanned servicing spacecraft 104, and generally includes a form of active propulsion such as one or more thrusters or engines. The one or more thrusters or engines allow the servicing spacecraft 104 to move in any direction with a velocity and/or a positive (i.e. increasing) or negative (i.e. decreasing) acceleration.

The servicing spacecraft 104 may include one or more robotic manipulators 108, which are able to capture and service client objects 112. The one or more robotic manipulators 108 may be distributed symmetrically or asymmetrically to exterior surfaces of the servicing spacecraft 104, and in some embodiments may be capable of capturing multiple similar or different client objects 112 simultaneously. In some embodiments, servicing spacecraft 104 may include multiple robotic manipulators 108, with one performing capture and arresting motion of client object 112 and a second for performing service operations as described herein.

Robotic manipulators 108 used for capture purposes may capture, move, release, or impart a velocity to a client object 112 through interaction with one or more grappling interfaces 124. The one or more grappling interfaces 124 are on accessible exterior surface(s) of the client object 112. The client object 112 may or may not be presently capable of self-movement, and may have one or more active or inactive thrusters or engines. In the illustrated embodiment, the client object 112 may be an inactive or out-of-service spacecraft having an engine and several thrusters. However, it should be understood the client object 112 may never have been capable of self-movement and may be inert or a completely passive object. The one or more grappling interfaces 124 are securely mounted to the client object 112 such that movement forces applied by the robotic manipulator 108 to the one or more grappling interfaces 124 will translate to equivalent movement forces applied to the client object 112, and the one or more grappling interfaces 124 do not separate from the client object 112 under specified capture, movement, and release (including down mass) forces.

In a scenario where a target satellite is beyond direct human vision, a grasping satellite or tug must be under the full control of a ground-based control center or have some fully or semi-autonomous control because the distance and communications delays may typically inhibit a directly human-operated capture system. To grapple or capture a satellite beyond direct vision, a system must exist for the grasping satellite to locate the client satellite, maneuver to the vicinity of the client satellite, observe the client satellite, match any rotation that the client satellite may have, reach out with a robotic manipulator, grasp the client satellite, arrest its motion, and secure it to the tug. When a client object 112 is beyond visual range, a human operator must rely on non-direct feedback (i.e., sensors). Communication delays between the operator and the tug/target could be significant enough so that the capture operation is conducted in a series of semi or fully automated steps.

Placement location(s) of the grappling interface(s) 124 on the client object 112 may be determined by one or more of magnetic compatibility, a client object 112 center of mass, an internal configuration of the client object 112, and a desire to minimize collision risk with appendages associated with the client object 112 or a capture device.

Once the client object 112 is fully and completely secured by the servicing spacecraft 104, the servicing spacecraft 104 may utilize a secondary robotic manipulator 108 to perform service operations. The service operations involve direct interaction between the servicing spacecraft 104 and the client object 112, and may include any form of data transfer, high or low pressure fluid transfer, or gas transfer. Service operations may be initiated by the servicing spacecraft 104 by moving an active portion of a modular service interface 116A into proximity to a passive portion of the modular service interface 116B. In addition to direct interaction between the servicing spacecraft 104 and client object 112, the modular service interface 116B on the client object 112 may allow the servicing spacecraft 104 to install a module onto the client object 112. The module would need to have at least the matching half of the modular servicing interface (116A) to plug into the interface on the client object 112. This allows installing or swapping components on a satellite in a simple manner with low risk of damage to either spacecraft. A process for managing a mating operation for the modular service interface 116 is described in more detail with respect to FIG. 12, and a process for managing a separation operation for the modular service interface 116 is described in more detail with respect to FIG. 13.

Because of the modular nature of the modular service interface 116, a given client object 112 may include various and different modular service interfaces 116. For example, a large and complex client object 112, such as a spacecraft or satellite may have one modular service interface 116 supporting data communication of a first type, a second modular service interface 116 supporting data communication of a second type, a third modular service interface 116 supporting low-pressure fluid transfer, a fourth modular service interface 116 supporting high-pressure fluid transfer, and a fifth modular service interface 116 supporting gas transfer.

Although both the servicing spacecraft 104 and the client object 112 may be movable objects at some point, in some embodiments the mating operation is performed at a ground location prior to spacecraft 104 launch, and the modular service interface 116 is only used for a single separation operation. Traditional cubesat deployers are fairly heavy (2-4 kg for a 3 U deployer when the satellites themselves typically have a mass of 3-5 kg), and especially for dedicated smallsat launchers having >$30 k/kg launch prices, can significantly increase the cost of launch for a cubesat. A variant of the modular service interface 116 with a spring ejector system may be able to serve as a separation system for unencapsulated cubesats, saving mass and launch costs. This is reflected in the connector interface option 208D shown in FIG. 6.

In addition to the other deployment modes described herein, modular service interfaces 116 may be used as a standardized way of mounting hosted payloads both prior to launch and on-orbit. For example, some "condosat" operators may prefer to replace hosted payloads on-orbit. Other spacecraft operators may prefer to mount sensors or other components onto their spacecraft either shortly before launch, or in a way that may be removed and replaced on-orbit.

Referring now to FIG. 2, a diagram illustrating a modular service interface 200 in accordance with a first embodiment of the present invention is shown. The modular service interface 200 is a separable interface including two parts: a first section or active section 204A and a second section or passive section 204B. The active section 204A is permanently and rigidly attached to another structure that is independently movable such as a robotic manipulator 108, or a module to be installed onto a client object 112 on the ground or in-space. The passive section 204B is permanently and rigidly attached to another structure that may not be capable of independent movement, and may generally be considered to be a client object 112.

In the first embodiment, the active section 204A includes a single electropermanent magnet surface 212 configured as a ring around a central connector interface 208. The electropermanent magnet surface 212, when activated, is configured to rigidly couple the active section 204A to the passive section 204B. The active section 204A also includes a driver assembly 216, which controls the operation of the electropermanent magnet surface 212 and is described in more detail with respect to FIGS. 10A-10F. Electropermanent magnet operation is also described in more detail in FIGS. 8A-9B and 11A-13. The modular service interface 200 requires no mechanical actuators to retain the active section 204A to the passive section 204B. This applies to all embodiments of the modular service interface 116, 200, 300, 330, 340, 400, and 500. While it is possible to add a redundant secondary mechanical latching mechanism to serve as a backup to the electropermanent magnets 212, 404, the magnets are strong enough that the interface does not require mechanical actuators, and none of the embodiments shown herein incorporate such backup mechanical actuators.

In the illustrated embodiment, the active section 204A also includes two or more alignment/power connections 220, which are alignment features. Each alignment feature mates with a corresponding alignment receiver or alignment hole. The alignment/power connections 220 provide for controlled mating and unmating between the active section 204A and the passive section 204B, and also provide switchable or unswitchable power connections between the active section 204A and the passive section 204B (and therefore between the servicing spacecraft 104 and the client object 112). In one embodiment, the servicing spacecraft 104 sources one or more power sources to the client object 112, while in another embodiment the client object 112 sources one or more power sources to the servicing spacecraft 104. In one embodiment, the alignment/power connections 220 include switching features to automatically provide power after the active section 204A is completely mated to the passive section 204B. In another embodiment, power is sourced through the alignment/power connections 220 under manual control. In one embodiment, one or more alignment posts 220 have a round-shaped profile and one or more alignment posts have a diamond-shaped profile. The preferred embodiment may utilize one standard round pin and one diamond pin diagonally opposed but in line with the long axis of the connector interface 208 data connector. This allows for greater misalignment as the round pin constrains five degrees of freedom while the diamond fixes the sixth (rotation about the round pin), while minimizing binding during assembly. FIG. 7 illustrates a preferred embodiment of the alignment/power connections 220.

While the illustrated embodiment shows the use of multiple alignment posts 220, other types of alignment features may be possible, including configuring the active 204A and passive 204B halves of the modular service interface in a conical axisymmetric configuration, where the conical shape of the two modular servicing interface halves 204A, 204B serves as an alignment feature and alignment receptacle. The main benefit of using more than one alignment feature as shown in this figure is that with two or more alignment features the relative alignment between both halves may be controlled in all six degrees of freedom. In the case of an axisymmetric conical configuration, the conical alignment features would only constrain five of the six degrees of freedom, with the relative rotation of the two halves 204A, 204B not being constrained. This would require the connector interface 208 to be designed in a way that does not require the rotational alignment to be constrained. For example, using a combination of pogo pins on the active side of the data connector interface 208A, and concentric ring traces on the passive side of the connector interface 208A, or using axisymmetric fluid transfer valves on the active and passive sides of the fluid connector interface 208B.

The connector interface 208 may include a first portion installed in the active section 204A and a matable second portion installed in the passive section 204B. FIG. 2 illustrates a data interface connector interface 208A installed in the active section 204A and a compatible data interface connector interface 208B installed in the passive section 204B. Each connector interface 208 may be function-specific, for example a form of data communication, fluid transfer, gas transfer, etc. Both the first portion and the second portion of a given connector interface 208 must be compatible with each other; otherwise the connector interface 208 halves will not mate properly and may possibly be damaged if forced together. In some embodiments, the connector interface 208 may further include a large array of perpendicularly arranged carbon nanotube surfaces to provide thermal conduction between the first 116A and second 116B halves when mated. In other embodiment, the connector interface 208 may further include an elastomeric thermal gap filler material to provide thermal conduction between the first 116A and second 116B halves when mated.

Examples of connector interface 208 options are shown in FIG. 6. While the illustrated embodiment shows the connector interface 208 as a ground-removable connector interface, it would also be possible to design either the active 204A or passive 204B side of the modular servicing interface with the connector interface permanently integrated into the structure of one or both halves 204A/204B of the servicing interface. The benefit of having this modular portion be removable is that it enables more efficiencies of scale in producing the modular servicing interface. This same comment applies to all embodiments of the modular service interface herein.

The passive section 204B has a similar footprint as the active section 204A, and includes a ferromagnetic face sheet 224 to provide a magnetic attraction surface for the electropermanent magnet surface 212. The ferromagnetic face sheet 224 corresponds to the ferrous target surface 904 of FIGS. 9A and 9B. The passive section 204B does not require the components of the driver assembly 216 and may therefore be lighter, thinner in profile, and lower cost than the active section 204A. Thus, the passive section 204B may be well suited for wide dissemination on all types of client objects 112 and in many locations of client objects 112 for convenient access.

The ferromagnetic face sheet 224 may include a thin (potentially <1 mm)ferromagnetic material layer (Hiperco-50) that allows the electropermanent magnet surface 212 to magnetically grip the passive section 204B. In the preferred embodiment, the ferromagnetic face sheet 224 thickness is approximately half the spacing distance between the magnetic pole pieces 308. In the preferred embodiment, the ferromagnetic face sheet 224 is made from a Hyperco-50 alloy (an approximately 50/50 Iron/Cobalt alloy). Carpenter 49 (an approximately 49% Iron/Nickel alloy having lower saturation flux and lower coercivity) or other alloys including Silicon electric steel or soft magnetic composites such as Somaloy may be used. The ferromagnetic face sheet 224 retains very little residual magnetization when not subjected to an external magnetic field, which minimizes magnetic interference. The ferromagnetic face sheet 224 may include aluminum cladding that enables easier bonding into the passive section 204B and protects the ferromagnetic face sheet 224 from corrosion. Aluminum cladding may provide a way to anodize-in durable optical fiducial markings that may aid in machine vision used for aligning and connecting the two halves of the interface. In one embodiment, the flatness of the ferromagnetic face sheet 224 is approximately +/−0.001" per linear foot.

The ferromagnetic face sheet 224 may be manufactured by laser or water jet cutting or machining the material to the correct shape, annealing it to achieve optimal magnetic properties, cold-spraying a 75 µm 1100 aluminum coating (i.e. cladding) onto both sides, alodyning one side of the ferromagnetic face sheet 224, and then sealing the anodization. In another embodiment, the aluminum coating may be applied via electroplating. In another embodiment, the aluminized Hiperco-50 could be replaced by a more corrosion-resistant soft magnetic alloy such as Carpenter High Permeability 49 alloy, which would not require aluminum plating. Carpenter High Permeability 49 alloy may be aluminum plated and anodized/pixodized. In another embodiment, the ferromagnetic face sheet 224, after annealing to achieve optimal magnetic properties, may be clad onto the underlying modular interface structural material 408 or passive section body 344A (typically an aluminum alloy) using explosive or hot roll cladding techniques. The resulting bimetallic sandwich may then be machined to remove the aluminum structural material and ferromagnetic material 224 as needed. The machined piece may then have the ferromagnetic material 224 aluminum clad using cold-spraying or electroplating, and then may have that surface anodized for increased durability.

The ferromagnetic face sheet 224 may include a soft magnetic material having high permeability, high saturation magnetization, and low coercive force. These properties enable robust magnetic attraction with a high holding force while ensuring that the active section 204 has a low residual magnetic field that doesn't interfere with components of other servicing spacecraft 104 or constellation owners. The coercive force may affect torque created by the Earth's magnetic field, but the larger the spacecraft the more torque it takes to induce a given angular acceleration. Other items on a spacecraft may induce magnetic dipoles (e.g., ferrous material in magnetorquers or hall thrusters, current loops caused by how the electronics and harnessing are designed, etc), so generally it is preferred to maintain a low worst-case residual dipole of the active section 204A.

In some embodiments, the modular service interface 116, regardless of shape or outline is required to be electrically conductive in order to eliminate static charge buildup and prevent damage to electronics associated with the client object 112 or servicing spacecraft 104, or any other component involved with the capture, movement, or release of a client object 112. In other embodiments, the capture interface 116 may not be required to be electrically conductive. The modular service interface 116 may also be required to completely disintegrate upon atmospheric reentry—regardless of the size, mass, and outline of the modular service interface 116.

It is important that the front surface or front face sheet 224 be flat relative to the mating electropermanent magnet surface 212, regardless of outline shape, in order to minimize an air gap between the electropermanent magnet surface 212 and the ferromagnetic face sheet 224. The presence of an air gap may result in reduced gripping force in response to peel forces. Although not shown in FIG. 2 for clarity, in some embodiments the $2^{nd}$ half modular service interface 116B (i.e. the side of the modular service interface 116 mounted to the client object 112) or ferromagnetic face sheet 224 may include one or more optical fiducial patterns to aid in machine vision target recognition and service interface mating operations.

Referring now to FIG. 3A, a diagram illustrating a modular service interface active section 300 in accordance with the first embodiment of the present invention is shown. FIG. 3A illustrates in more detail the active section 204A shown in FIG. 2. The modular service interface includes an active section body 304A, which provides a support structure for the electropermanent magnet (EPM) components, the connector interface, and the driver assembly 216. In most embodiments, the active section body 304A may be constructed from aluminum, steel, or other materials and is inherently or treated in such a way as to resist or prevent corrosion. Shown is an array of magnetic pole pieces 308A, where each magnetic pole piece 308 is a separately activated or inactivated magnet. Two alignment/power connections 220 are shown, although in some embodiments more than two alignment/power connections 220 may be present. Also present are holes 320 for the driver assembly 216 attachment. The front surface is preferably of planar disposition and essentially flat in order to facilitate strong magnetic force and efficiency.

The modular service interface active section 300 includes a receiver for a connector interface 312, which is an open space that accepts any of several connector interfaces 208, as described herein. The receiver for connector interface 312 is shown in more detail in FIG. 4.

Referring now to FIG. 3B, a diagram illustrating a modular service interface active section 330 in accordance with a second embodiment of the present invention is shown. The second embodiment of the active section 330 features a series of lengthwise magnetic pole pieces 308B that form EPM ring 316B, instead of cylindrical magnetic pole pieces 308A that form EPM ring 316A shown in FIG. 3A. Four holes 320 are provided for driver assembly attachment, although a different number of holes 320 or different mounting arrangement for the driver assembly 216 may be used. The second embodiment of the active section 330 includes an active body section 304B, similar to active body section 304A of FIG. 3A.

In some embodiments, the modular service interface active section 330 may include a receiver for a connector interface 312, which is an open space that accepts any of several connector interfaces 208, as described herein. The receiver for connector interface 312 is shown in more detail in FIG. 4. In other embodiments, the connector interface 312 may be rigidly attached to the modular service interface active section 330 and not swappable/removable.

Referring now to FIG. 3C, a diagram illustrating a modular service interface passive section in accordance with embodiments of the present invention is shown. The passive section 340 features a passive section body 344A, constructed similarly to the active section bodies 304A, 304B. Instead of magnetic pole pieces 308, the passive section 340 includes a ferromagnetic face sheet 224 as previously described. The passive section 340 may be mated with either of the active sections 300, 330.

In some embodiments, the modular service interface passive section 340 may include a receiver for a connector interface 312, which is an open space that accepts any of several connector interfaces 208, as described herein. The receiver for connector interface 312 is shown in more detail in FIG. 4. In other embodiments, the connector interface 312 may be rigidly attached to the modular service interface passive section 340 and not swappable/removable.

Referring now to FIG. 4, a diagram illustrating a modular service interface 400 in accordance with a third embodiment of the present invention is shown. The third embodiment is an "androgynous" embodiment, where each half of the modular service interface 116A, 116B includes both active and passive elements. Only one half 116 is shown, where the other half would be substantially similar. Each half 400 includes a modular service interface body 408, which may be made from Aluminum, Steel, or other suitable rigid material. Each half 400 also includes a pair of EPM modules 404, arranged on opposite sides of the interface, with a pair of ferromagnetic face sheets 224 also arranged on opposite sides of the interface. Thus, a given EPM module 404 on one section of the interface will mate with a corresponding ferromagnetic face sheet 224 on the other section of the interface. Because each section includes a pair of EPM modules 404, each section also includes a driver assembly 216. The advantage of such an arrangement may be that both sections 400 of the modular service interface 400 may potentially be identical and thereby simplify manufacture. However, because of the additional circuitry required by each section 400, the cost may be close to the cost of an active section 300 or 330 and prevent cost savings by proliferating more of the lower-cost passive sections 340.

Also of note in FIG. 4 is the receiver for connector interfaces 312. The connector interfaces 208 may be completely independent of the active sections 300, 330, the passive section 340, and the androgynous section 400—aside from simple corner mounting holes or other mounting arrangements. This, each connector interface 208 may be used with different arrangements of active/passive sections, and either the connector interface 208 or the active/passive sections may be changed or upgraded without affecting the other.

Referring now to FIG. 5, a diagram illustrating a modular service interface 500 in accordance with a fourth embodiment of the present invention is shown. The embodiment illustrated in FIG. 5 represents the preferred embodiment, and features separate active 504A and passive 504B sections as previously described. However, instead of a monolithic EPM ring 316A, 316B, the fourth embodiment features a group of EPM modules 404, which act in unison and provide the same macro functionality as active sections 300 and 330. In the illustrated embodiment, there are four equal-size EPM modules 404, arranged symmetrically around the connector interface 208. In other embodiments, there may be a different number of EPM modules 404, and the EPM modules 404 may the same size or different sizes. Each EPM module 404 has a corresponding ferromagnetic face sheet section 244.

The modular service interface 500 includes an active section body 304C and a passive section body 344C, which are differently shaped than the first, second, or third embodiments in order to mount the separate EPM modules 404. The fourth embodiment illustrates a connector interface 208, which includes a data interface 208A. Details of the EPM modules 404 are shown and described with reference to FIGS. 8A and 8B.

In a preferred embodiment, the modular service interface 116 is approximately 75 mm×75 mm in profile and 15-30 mm in height, and having a mass without a connector interface 208 installed of <250 grams for an active section 116A and <80 grams for a passive section 116B. The pull-off force of a modular service interface 116 when activated may be approximately 400 Newtons.

Referring now to FIG. 6, a diagram illustrating connector interface options 800 in accordance with embodiments of the present invention is shown. In one embodiment, connector interfaces 208 may be functionally independent from the active 116A and passive 116B sections, and conceivable functionality may be modularly supported in connector interfaces 208. In one embodiment, connector interfaces 208 may be swappable or replaceable to reconfigure a modular service interface. In another embodiment, connector interfaces 208 may be specifically tied to active 116A and passive 116B sections, and not able to be swapped out or replaced. In one embodiment, the connector interface 208 may include multiple sub-interfaces that may or may not be adjacent or spatially contiguous. In another embodiment, the connector interface 208 may be centrally located within the modular service interface. In another embodiment, one or more connector interfaces 208 may be disposed alongside of or around one or more EPM modules 404. A few examples of connector interfaces 208 are shown in FIG. 6, but it should be understood that the present application is not limited to only the specific cores 208 shown and described herein.

One type of connector interface 208 may include a data interface module 208A. Data interface module 208A may support any number and type of data communication channels, including wired, wireless, low speed, high speed, variable speed, optical, radio frequency (RF), encoded, unencoded, encrypted, unencrypted, analog, digital, and any other form of data communications. While FIG. 6 shows a typical electrical connector with fixed pins and sockets, many other variations are possible including "pogo" pins, non-contact optical data transmission, hyperboloid electrical connectors, and many other variations known in the art.

Another type of connector interface 208 may include a fluid transfer module 208B. Fluid transfer module 208B may support low pressure or high pressure fluid transfer and in some embodiments, multiple types of fluid transfer. A low-pressure fluid transfer module 208B may allow for in-space water transfer and have the ability to hold 5 psi during transfer support two-way (bidirectional) flow. If the valve is to be used for other The low-pressure fluid transfer module 208B may also be usable for other fluids such as Hydrazine. Such a fluid transfer module 208B may use a face seal with solenoid-controlled poppets in order to reduce the drip volume when the fluid transfer module 208B is disconnected.

High pressure fluid transfer connector interfaces 208B may facilitate on-orbit refueling of satellites utilizing high pressure Xenon for electric propulsion. This core 208B may also allow a servicing vehicle 104 to siphon off fuel from dead satellites (client object 112) that are being deorbited, thus extending the life the servicers 104. The high pressure fluid transfer connector interface 208B may allow for two-way flow and 3000 psi gas transfer. Four thermally conductive surfaces 604 are shown. The thermally conductive surfaces 604 may include a large array of carbon nanotubes of perpendicular disposition to the one or more surfaces 604 or an elastomeric thermal gap filler material. Any number of thermally conductive surfaces 604 may or may not be present, and any type of connector interface 208 may include thermally conductive surfaces 604.

Another type of connector interface 208 may include a mechanical force transfer module 208C. In one embodiment, the mechanical force transferred is a torque force, and a splined shaft and socket combination fit together to provide mechanical torque between the active 116A and passive 116B sections. In some embodiments, the mechanical force transfer module 208C may include self-locating features in order to facilitate blind and reliable mating between each half of the mechanical force transfer module 208C. In other embodiments, different forms of mechanical force transfer may be provided.

Another type of connector interface 208 may include a spring force ejection module 208D, as described herein for cubesat ejection from a rocket or spacecraft. In this case, the spring ejection module 208D may be mounted to the rocket or spacecraft (active section 116A), while a corresponding flat rigid plate may be mounted in the receiver 312 of the rear of a cubesat (passive section 116B). When the cubesat is loaded onto the rocket or spacecraft, the active section 116A is activated to keep the cubesat seated to the rocket or spacecraft. At the time of cubesat deployment, the active section is inactivated (i.e. EPM rings 316A, 316B or EPM modules 404 are inactivated and no longer attracted to the ferromagnetic face sheet(s) 224), and spring force of the spring ejection module 208D, bearing against the previously described flat rigid plate, ejects the cubesat from the rocket or spacecraft. Doing this may eliminate the need for placing the cubesat inside a canister, which can potentially save launch mass and cost, while leaving behind a modular servicing interface passive half (116B) on the cubesat for future servicing.

Another type of connector interface 208 (not shown) may support high-pressure gas transfer, either as a blind-mate connector for robotically-servable modular life support components (which may require oxygen compatibility), or for high-pressure Xenon, Krypton, Argon, or other gas transfer for refueling Solar Electric Propulsion (SEP) systems or low-altitude earth observation vehicles that use SEP systems for long duration flights at very low altitudes (<300 km). While there are larger all-mechanical Xenon transfer solutions, a modular service interface 116-based Xenon transfer system would be much easier to fit into smaller, volume-constrained spacecraft such as cubesats, as well as cubesat-scale refueling pods.

Referring now to FIG. 7, a diagram illustrating an alignment and power connection 220 in accordance with embodiments of the present invention is shown. FIG. 7 illustrates an embodiment of an alignment post/receiver pair providing electrical power transfer between an active 116A and a passive 116B section. An active section 704A may be rigidly attached to the active section 116A, and in some embodiments sources power to the passive section 116B. The active section 704A of the alignment and power connection 220 includes an alignment post or pin 708, which is preferably insulated from the power at all time in order to reduce the chance of electrical short circuits during mating operations.

The passive section 704B of the alignment and power connection 220 includes an alignment socket 720, which engages the alignment pin 708 and guides coaxial mating until sully seated. The passive section 704B in one embodiment includes a rigid electrical pin 724, which transfers DC or AC power. The active section includes an electrical hyperboloid socket 712, which makes contact with the electrical pin 724. As the alignment pin 708 is seated within the alignment socket 720, the electrical pin makes contact with the hyperboloid connector within a PEEK bushing, and current then flows through both the active 704A and passive 704B sections. In one embodiment, each alignment and power connection 220 is built from A2 tool steel, may deliver up to 12 Amperes at 28 Volts DC, and is able to support 100 lbs (444 Newtons) of load in shear with a factor of safety of >1.5. In another embodiment, the passive socket side of the alignment and power connection may be machined integrally into the body of the aluminum modular interface, and then nickel plated or hard-coat anodized for durability. This may make dimensions harder to control, but may be potentially less expensive and potentially be more mechanically robust.

Referring now to FIG. 8A, an illustration depicting a magnet/coil array in accordance with embodiments of the present invention is shown. Although the magnet/coil array may be formed with wire 1120 wound around magnets 1108, a more compact and easier to manufacture form for the magnet/coil array may be desirable. Each wrap of the coil around a group of magnet pole pieces 308A may instead be provided by a coil layer 808, which is shown in more detail in FIG. 8B. A sandwich of coil layers 808 around the group of magnet pole pieces 308A thus provides the coil 1024 and the required inductance. Each of the coil layers 808 is then wired to adjacent coil layers 808 (not shown). In one embodiment, an insulating layer 804 is provided between each pair of coil layers 808 to prevent short circuits between coil layers 808. This may be achieved using flexible printed circuit fabrication, where a copper-plated thin film plastic such as Kapton has its copper-plating etched to leave behind the copper coil layers 808 in the desired winding pattern, intimately bonded to the Kapton insulating layers 904. Other PCB insulating materials and conductors are also possible in other embodiments. Alternately, each coil layer 808 may be sprayed or otherwise provided with an insulating coating that may eliminate a need for the separate insulating layers 804.

A yoke 816 may be provided below the bottom insulating layer 804. The yoke 816 is a magnetic alloy flux conductor, disposed beneath the magnetic pole pieces 308, and is configured to provide a magnetic flux return path for the magnetic pole pieces 308. In one embodiment, the magnet pole pieces 308A are each approximately 3.2 mm wide×6.4 mm long.

Referring now to FIG. 8B, an illustration depicting coil layer 808 detail in accordance with embodiments of the present invention is shown. FIG. 8B provides a plan view of an exemplary coil layer 808 that is designed to induce alternating polarizations in the magnet pole pieces 308A. The coil layer 808 is preferably made from copper or other highly conductive coil traces 828, and is routed in a pattern around each of the magnet pole pieces 308A, with the pattern forming a conductive path that follows an alternating clockwise, counterclockwise pattern around alternating magnet pole pieces 308A. Each coil layer 808 includes a coil first end 820 and a coil second end 824. Keeping in mind that each coil layer 808 provides only a single wrap around the group of magnet pole pieces 308A, it is important that all coil layers 808 in the same group (i.e. for the same group of magnet pole pieces 308A) be wired identically so that all the wraps contribute to magnetization. Therefore, for a first coil layer 808A, the first end 820A may be coupled to switches S1 1028 and S3 1036 (FIG. 10A), and the second end 824A is attached to the first end 820B of the second coil layer 808B. The second end 824B of the second coil layer 808B is attached to the first end 820C of the third coil layer 808C, and so forth.

Referring now to FIG. 9A, a diagram illustrating magnetic flux for close range attraction 900 in accordance with a first embodiment of the present invention is shown. An electropermanent magnet (EPM) may be used to attract surfaces having one or more ferromagnetic or ferrous target surfaces 224. An EPM may include one or more magnet pole pieces 308 in close proximity to a yoke 816. The magnet pole pieces 308 may be individually charged to a configuration having a north pole 916 facing the ferrous target surface 904 or a configuration having a south pole 920 facing the ferrous target surface 904. The magnet pole pieces 308 may also be discharged as described with respect to the flowchart of FIG. 13.

One of the overall EPM charge configurations is optimized for close range object capture. Close range capture is defined herein as in contact to a maximum separation distance. The maximum separation distance for close range capture is a distance $D_2$ 932 where $D_2$ 932 is less than or equal to $D_1$ 928 and $D_1$ 928 is a distance between the magnet pole pieces 308A. In a preferred embodiment, close range capture is from in contact to approximately 0.4 centimeters. In order to achieve the close range object capture configuration, each magnet pole pieces 308 in sequence is oppositely charged. This alternating pattern of magnet pole piece 308 charges provides the greatest number of flux lines 924, although with correspondingly short return paths—hence limiting capture or attraction range to the ferrous target surface 904. Flux direction 912 is from the south pole 920 to the north pole 916, and since adjacent magnet pole pieces 308 are oppositely polarized, the flux return paths are very short.

Referring now to FIG. 9B, a diagram illustrating magnetic flux for close range attraction in accordance with a second embodiment of the present invention is shown. The embodiment shown in FIG. 9B has the same goal of optimized short range capture as the embodiment shown in FIG. 9A, but achieves this with a different magnet pole piece 308 and yoke 816 configuration. Instead of the yoke 816 coupled to a far end of the magnet pole pieces 308 relative to the ferrous target surface 904, the yoke 816 is configured as longitudinal sections between each magnet pole piece 308. The magnet pole pieces 308 are positioned near a rear end of each of the yoke 816 sections, and are configured with like poles between adjacent magnet pole pieces 308 facing each other. Thus, north poles 916 of adjacent magnet pole pieces 308 face each other and south poles 920 of adjacent magnet pole pieces 308 face each other. Advantageously, the embodiment of FIG. 9B has improved attraction or capture force relative to the embodiment of FIG. 9A.

Referring now to FIG. 10A, a block diagram of an electropermanent magnet assembly 1000 in accordance with embodiments of the present invention is shown. The components shown and described in FIGS. 10A-10F reflect components of the driver assembly 216, which controls operation of the electropermanent magnet surface 212, EPM ring 316, and EPM modules 404. The electropermanent magnet (EPM) 1000 includes a charger 1008, a capacitor 1012, a control circuit 1016, and one or more thyristor H bridges 1004. A greater number of thyristor H bridges 1004 includes more coils 1024 (each coil 1024 is associated with one magnetic pole piece 308). In other embodiments, thyristor H bridges 1004 may not be used and instead MOSFETS or IGBTs may be used to provide the switching functions.

The charger 1008 is a power supply that functions to charge a capacitor 1012 as directed by a charger enable/disable signal 1044 from the control circuit 1016. In the preferred embodiment, the charger 1008 is a switching DC power supply such as a buck-boost power supply, but in other embodiments may be a different form of power supply, including linear power supplies or different types of switching power supplies.

The capacitor 1012 is charged to a predetermined voltage by the charger 1008, and the way it is discharged through the thyristor H bridges 1004 determines the polarity for each magnetic pole piece 308. In a preferred embodiment, the capacitor 1012 may be a 50 uF MLCC capacitor. Each thyristor H bridge 1004 includes one coil 1024/magnetic pole piece 308 and four switches 1028, 1032, 1036, 1040. The switches are opened/closed in pairs in order to control whether current is flowing through the coil 1024, and the direction of current travel—which affects magnetic pole piece 308 polarity. Switches 1028/1040 are opened/closed at the same time, and switches 1032/1036 are opened/closed at the same time. The switch operations are described on more detail with respect to FIGS. 10B-10E.

The control circuit 1016 receives a command 1020, and in response controls the charger enable/disable 1044 to the charger and switch control 1048 to each of the switches 1028, 1032, 1036, 1040. The command 1020 may be a command from a computer, a computer application, a graphical user application (GUI) associated with a computer and selected by a user, or a hardware switch output from a control activated by a user. The command 1020 may specify several actions taken by the EPM 1000, including enable close range capture, enable longer range capture, and demagnetize the magnets. Other commands 1020 may be utilized, including but not limited to specifying a voltage level the capacitor 1012 should be charged to, specifying the behavior of a specific thyristor H bridge 1004, or designating the open or closed position for a specific switch 1028, 1032, 1036, 1040. The control circuit 1016 may be implemented as any form of known control function, including processor(s)/memories, microcontroller(s), field-programmable gate array(s) (FPGAs), programmable logic, state machine(s), pure hardware, or any combination of hardware/software/application(s).

Referring now to FIG. 10B, a block diagram illustrating a charging phase for an electropermanent magnet assembly 1050 in accordance with embodiments of the present invention is shown. The charging phase 1050 is used in association with charging an EPM 1000, or as one of the many charging steps required for a demagnetization process.

For the charging phase 1050, the control circuit 1016 receives a command 1020 that specifies the new operating mode, or a charge capacitor command 1054. In one embodiment, the charge capacitor command 1054 specifies a voltage level to charge the capacitor 1012 to. The control circuit 1016 then enables the charger 1056 and the charger 1008 charges the capacitor 1058. In one embodiment, the charger enabled signal 1056 may be timed by the control circuit 1016 in order to charge the capacitor 1058 to the desired voltage. In another embodiment, the charger 1008 may control the charge capacitor 1058 to charge to the desired voltage in response to receiving a charger enabled 1056 of any duration. In this phase, all switches 1028, 1032, 1036, 1040 of all thyristor H bridges 1004 are in the open state since closed switches may prevent the capacitor 1012 from charging.

Referring now to FIG. 10C, a block diagram illustrating a discharging phase through a forward coil for an electropermanent magnet assembly 1060 in accordance with embodiments of the present invention is shown. The discharging phases of FIGS. 10C and 10D provide the phases where the magnetic pole pieces 308 are actually polarized in order to program the EPM for close-range capture or demagnetization. Phase 10C is performed after phase 10B (charge capacitor 1012).

The discharge sequence to program a magnetic state into an EPM 1000 has the following key characteristic. It should be readily apparent to those of skill in the art that magnitude of the listed values will vary depending on design-specific conditions and component selection:

It is a very fast process (25 microseconds to 100 microseconds discharge time)
It has very high currents (250+ Amperes)
It has very high voltage (250+ Volts)
It has very high power (50+ kW)
It has very low energy compared to the power (10's of Joules), because the time duration is very small EPMs 1000 may utilize one or more thyristor H-bridges 1004 to control the direction of flow of current to program a magnetic pole piece 308 into a given state. Depending on which switches 1028, 1032, 1036, and 1040 are set open and which are set closed, current will flow through the EPM windings 1024 one of two directions, programming the corresponding magnetic pole piece 308 into one of two magnetic states (N-S or S-N). Thyristors 1004 are selected for their very high power and energy handling characteristics compared to MOSFETs or IGBTs. Once a thyristor 1004 has been fired/triggered, it will continue to allow current to flow through until the flow drops to near zero, this means that the entire capacitor 1012 must discharge for any given command to reprogram the magnetic pole pieces 308. MOSFETs are not capable of handling large amounts of power, so many more of them would be needed to accomplish the task. However, they are more efficient and more controllable than thyristors 1004 (e.g. you could modulate the discharge of the capacitor 1012 and finely control current). This is not a large advantage for an EPM attraction device where all one is attempting to do is program a single magnetic state into a given magnetic pole piece 308, but theoretically could be more useful if EPM technology was incorporated into some form of electric motor—which may be optimized for high torque per unit power and operate at modest rotational or linear speeds.

The control circuit 1016 receives an enable forward current through coil(s) command 1062. In one embodiment, the command 1062 specifies which of the switches 1028, 1032, 1036, 1040 to open and/or close. In another embodiment, the control circuit 1016 determines switch states 1028, 1032, 1036, 1040 after receiving the enable forward current through coil(s) command 1062. In response to receiving the enable forward current through coil(s) command 1062, the control circuit 1016 first provides a charger disable 1066 to the charger 1008, which stops the charger 1008 from continuing to charge the capacitor 1012. In one embodiment, the charger disable 1066 results in the charger 1008 being decoupled from an input AC or DC power source (not shown), possibly including one or more batteries.

After disabling the capacitor 1012 charging, the control circuit 1016 directs the thyristor H bridge 1004 to close switches S1 and S4 1064 (and keep switches S2 1032 and S3 1036 open). The same switch activations/deactivations are provided to any other thyristor H bridges 1004 that may be present in EPM 1000. Closing S1 1028 and S4 1040 causes the capacitor 1012 to discharge through both switches S1 1028, S4 1040, resulting in a forward current through coil 1024 and a change in magnetization of the corresponding magnetic pole piece 308.

Referring now to FIG. 10D, a block diagram illustrating a discharging phase through a reverse coil for an electropermanent magnet assembly 1070 in accordance with embodiments of the present invention is shown. The discharging phases of FIGS. 10C and 10D provide the phases where the magnetic pole pieces 308 are actually polarized in order to program the EPM for close-range capture or demagnetization. Phase 10D is performed after phase 10B (charge capacitor 1012).

The control circuit 1016 receives an enable reverse current through coil(s) command 1072. In one embodiment, the command 1072 specifies which of the switches 1028, 1032, 1036, 1040 to open and/or close. In another embodiment, the control circuit 1016 determines switch states 1028, 1032, 1036, 1040 after receiving the enable reverse current through coil(s) command 1072. In response to receiving the enable forward current through coil(s) command 1072, the control circuit 1016 first provides a charger disable 1076 to the charger 1008, which stops the charger 1008 from continuing to charge the capacitor 1012. In one embodiment, the charger disable 1076 results in the charger 1008 being decoupled from an input AC or DC power source (not shown), possibly including one or more batteries.

After disabling the capacitor 1012 charging, the control circuit 1016 directs the thyristor H bridge 1004 to close switches S2 and S3 1074 (and keep switches S1 1028 and S4 1040 open). The same switch activations/deactivations are provided to any other thyristor H bridges 1004 that may be present in EPM 1000. Closing S2 and S3 causes the capacitor 1012 to discharge through both switches S2 1032, S3 1036, resulting in a reverse current through coil 1024 and a change in magnetization of the corresponding magnetic pole piece 308.

Referring now to FIG. 10E, a block diagram using multiple coils an electropermanent magnet assembly 1080 in accordance with a first embodiment of the present invention is shown. Multiple thyristor H bridges 1004 are present, identified herein as thryristor H bridge A 1004A through thryristor H bridge N 1004N. Each thryristor H bridge 1004 includes switches S1 1028, S2 1032, S3 1036, and S4 1040. Thyristor H bridge A 1004A includes switches S1A 1028A, S2A 1032A, S3A 1036A, and S4A 1040A. Thyristor H bridge N 1004N includes switches S1N 1028N, S2N 1032N, S3N 1036N, and S4N 1040N. Any number of thyristor H bridges 1004 may be present in EPM 1000, 1080, and separate switch controls 1048 are provided to each thyristor H bridge 1004. Control circuit 1016 provides switch control A 1048A to thyristor H bridge A 1004A and switch control N 1048N to thyristor H bridge N 1004N.

Although multiple thyristor H bridges 1004 are present for EPM 1080, the switch controls 1048 may be different, depending on operating mode. For the close capture configuration, some coils 1024 use forward current to program the north pole 916 in one direction while other coils 1024 use reverse current to program the north pole 916 in an opposite direction.

Referring now to FIG. 10F, a block diagram using multiple coils an electropermanent magnet assembly 1084 in accordance with a second embodiment of the present invention is shown. FIG. 10F illustrates the preferred embodiment, where multiple thyristor H bridges 1004, 1086 are present—but only a complete thyristor H bridge 1004 is required. Additional ½× thyristor H bridges 1086 are provided for each additional coil 1024. Only a last (Nth) ½ thyristor H bridge 1086 is shown for clarity, which includes coil 1024N and switches 1032N and 1040N. Any number of ½ thryistor H bridges 1086 may be present in EPM 1084, and separate switch controls 1048 are provided to each thyristor H bridge 1004 or ½ thyristor H bridge 1086. Control circuit 1016 provides switch control A 1048A to thyristor H bridge A 1004A and switch control N 1048N to ½ thyristor H bridge N 1086. The embodiment illustrated in FIG. 10F does not require switches 1028 and 1036 for the ½ thyristor H bridges 1086, which significantly reduces the number of switches required.

Referring now to FIG. 11A, a diagram illustrating flux direction in a single coil 1024 in accordance with embodiments of the present invention is shown. A coil 1024 is formed by wrapping a wire 1120 around a magnet pole piece 308. In the embodiment illustrated, a discrete wire 1120 is used. However, a preferred embodiment for the coil 1024 is shown in FIGS. 8A and 8B.

A current flow 1104 with direction shown is produced when the capacitor 1012 is discharged through switches (either S1 1028 and S4 1040 or S2 1032 and S3 1036). The current flow 1104 polarizes the magnet 308 with a north pole 1112 and a south pole 1116 as shown, producing a flux direction 1124 from the south pole 1116 to the north pole 1112, and extending outward from the magnet 308 as shown.

Referring now to FIG. 11B, a diagram illustrating flux direction in dual coils 1130 in accordance with embodiments of the present invention is shown. Stronger magnetic fields may be created by wiring multiple magnets 308 together. Two magnets 308 are shown in FIG. 11B, identified as magnet 308A and 308B. The direction of current flow 1104 establishes the north pole 1112 and south pole 1116 polarity for each magnet 308, with magnet 308A having north pole 1112A and south pole 1116A, and magnet 308B having north pole 1112B and south pole 1116B. Because of the routing of the coil, the north pole 1112A is aligned with south pole 1116B and south pole 1116A is aligned with north pole 1112B. This results in a clockwise flux direction 1124, as shown.

Referring now to FIG. 12, a flowchart illustrating a modular interface service process in accordance with embodiments of the present invention is shown. Flow begins at block 1202.

At block 1202, the client object 112 is securely captured. The modular service interface 116 is not intended to be directly used for capture operations, where high axial, shear, or rotation forces may be encountered. Therefore, the client object 112 must be fully captured prior to initiation of mating operations between the $1^{st}$ half modular service interface 116A and the $2^{nd}$ half of the modular service interface 116B. Fully captured means the client object 112 has zero velocity relative to the servicing spacecraft 104, the client object 112 is not experiencing any rotational movement relative to the servicing spacecraft 104 (i.e. roll, pitch, or yaw), and there is a rigid connection between the client object 112 and the servicing spacecraft 104. A rigid connection may be provided, for example, by a capture head 120 rigidly affixed to a grappling interface 124 as shown in FIG. 1. Flow proceeds to block 1204.

At block 1204, a $1^{st}$ half of the modular service interface 116A is moved in proximity to a $2^{nd}$ half of the modular service interface 116B. The client object 112 has already been fully arrested/captured, and is therefore not moving relative to the $1^{st}$ half of the modular service interface 116A. Flow proceeds to block 1208.

At block 1208, alignment features 220 of the $1^{st}$ half of the modular service interface 116A are engaged with matching receiving features of the $2^{nd}$ half of the modular service interface 116B. Flow proceeds to block 1212.

At block 1212, a $1^{st}$ portion of a connector interface 208 is coupled to a $2^{nd}$ portion of the connector interface 208. Flow proceeds to decision block 1216.

At decision block 1216, a determination is made if the $1^{st}$ half of the modular service interface 116A is in direct contact with the $2^{nd}$ half of the modular service interface 116B. If the $1^{st}$ half of the modular service interface 116A is in direct contact with the $2^{nd}$ half of the modular service interface 116B, then flow proceeds to block 1224. If instead the $1^{st}$ half of the modular service interface 116A is not in direct contact with the $2^{nd}$ half of the modular service interface 116B, then flow proceeds to block 1220.

At block 1220, the $1^{st}$ half modular service interface 116A continues to move toward the $2^{nd}$ half of the modular service interface 116B. Flow proceeds to decision block 1216 to again check for direct contact.

At block 1224, the EPM modules 404 of the modular service interface 116 are activated. This produces are large attraction force between the EPM modules 404 and ferromagnetic face sheet(s) 224, and holds the two halves 116A, 116B together until unengaged. Flow proceeds to block 1228.

At block 1228, DC power is provided through the alignment connections 220. It order to minimize the possibility of various forms of short circuits, DC power is disabled through the alignment connections 220 until the EPM modules 404 have been activated. Once activated, all electrical contacts are properly aligned and DC power may be safely applied. Flow proceeds to block 1232.

At block 1232, connector interface 208 functionality is activated. In one embodiment, data communications may be initiated through a data communications interface 208A. In another embodiment, fluid transfer (either high or low pressure, subject to appropriate design parameters) may be initiated through a fluid transfer module 208B. In another embodiment, a mechanical force (such as a torque force) may be transferred through a mechanical force transfer module 208C. Flow ends at block 1232.

Referring now to FIG. 13, a flowchart illustrating a modular interface separation process in accordance with embodiments of the present invention is shown. Flow begins at block 1304.

At block 1304, connector interface 208 functionality is inactivated. In one embodiment, data communications may be discontinued through a data communications interface 208A. In another embodiment, fluid transfer (either high or low pressure, subject to appropriate design parameters) may be inhibited through a fluid transfer module 208B. In another embodiment, a mechanical force (such as a torque force) may be stopped through a mechanical force transfer module 208C. Flow proceeds to block 1308.

At block 1308, DC power is removed from the alignment connections 220. It order to minimize the possibility of various forms of short circuits, DC power is disabled through the alignment connections 220 after the connector interface 208 has been inactivated. Once inactivated, there is no possibility of short circuit connections as the $1^{st}$ half modular interface 116A is unmated from the $2^{nd}$ half modular interface 116B. Flow proceeds to block 1312.

At block 1312, the EPM modules 404 of the modular service interface 116 are inactivated. Inactivation of the EPM modules 404 involves successive charging of the EPM modules 404 with pulses of decreasing amplitude and reversed polarity. This reduces the attraction force between the EPM modules 404 and ferromagnetic face sheet(s) 224, and allows the two halves 116A, 116B to be separated. Flow proceeds to block 1316.

At block 1316, the $1^{st}$ half of the modular interface 116A is moved away from the $2^{nd}$ half of the modular interface 116B, by a robotic manipulator 108. This releases the client object 112 from the $1^{st}$ half of the modular service interface 116A. Flow proceeds to decision block 1320.

At decision block 1320, a determination is made if the alignment features 220 are clear of the corresponding receiving features. If the alignment features 220 are clear of the corresponding receiving features, then the separation process is complete, and flow ends at decision block 1320. If instead the alignment features 220 are not clear of the corresponding receiving features, then the separation process is not complete, and flow proceeds to block 1316 to continue to move the $1^{st}$ half of the modular service interface 116 away from the $2^{nd}$ half of the modular service interface 116B.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A modular service interface comprising separable first and second halves, the modular service interface comprising:
   one or more alignment features;
   a connector interface, comprising one of:
     a data core configured to provide data communications between the first and second halves;
     a fluid transfer core configured to transfer one of low pressure or high pressure fluids between the first and second halves;
     a mechanical coupler configured to transfer a torque force between the first and second halves; or
     a spring ejection core configured to provide separation force between the first and second halves,
     wherein the connector interface is configured to be rigidly attached to the receiver;
   one or more electropermanent magnet modules, configured to rigidly couple the first and second halves when activated and allow the first and second halves to be separated when inactivated; and
   a control circuit,
   wherein the control circuit is configured to initially activate the one or more electropermanent magnet modules in response to the first half in contact with the second half,
   wherein the modular service interface comprises no mechanical actuators to retain the first half to the second half.

2. The modular service interface of claim 1, wherein one or more alignment features on one of the first and second halves comprises a plurality of alignment posts, wherein one or more alignment features on the other of the first and second halves comprises holes to receive the plurality of alignment posts, wherein the plurality of alignment posts are configured to provide power and ground connections between the first and second halves.

3. The modular service interface of claim 2, wherein one or more alignment posts comprises a round-shaped profile, wherein one or more alignment posts comprises a diamond-shaped profile, wherein the plurality of alignment posts are configured to maintain a parallel orientation between the first and second halves during mating.

4. The modular service interface of claim 1, wherein the connector interface is configured to provide data communications, transfer fluids, transfer torque, and provide separation force only in response to the first half is coupled to the second half.

5. The modular service interface of claim 4, wherein the connector interface is centrally disposed within and configured to be removable from the modular service interface; wherein the connector interface further comprises one or more surfaces of one or more of the first and second halves to provide thermal conduction between the first and second halves when mated.

6. The modular service interface of claim 5, wherein the one or more surfaces to provide thermal conduction comprises one of a large array of carbon nanotubes of perpendicular disposition to the one or more surfaces or an elastomeric thermal gap filler material.

7. The modular service interface of claim 1, wherein the one or more electropermanent magnet modules each comprises an active portion on one of the first and second halves and a passive portion on the other of the first and second halves, wherein each passive portion comprising a flat ferromagnetic surface that corresponds to each active portion.

8. The modular service interface of claim 7, wherein each active portion comprises:
   a plurality of magnetic pole pieces;
   a continuous conductive winding wrapped around each of the magnetic pole pieces, configured to magnetize or demagnetize the plurality of magnetic pole pieces in unison;
   a magnetic alloy flux conductor, disposed beneath the plurality of pole pieces, configured to provide a magnetic flux return path for the plurality of magnetic pole pieces; and
   wherein the modular capture interface further comprises the control circuit coupled to the conductive winding, configured to one of activate or inactivate the active portions in response to receiving a command.

9. The modular service interface of claim 8, wherein the control circuit activates or inactivates each of the one or more electropermanent magnet modules in unison, wherein when activated, the active portions provide attraction force to the passive portions, wherein when inactivated the active portions do not provide attraction force to the passive portions.

10. The modular service interface of claim 9, wherein the control circuit inactivates the one or more electropermanent magnet modules comprises the control circuit configured to pulse each electropermanent magnet module with a plurality of magnetization pulses of opposite successive polarity and decreasing amplitude.

11. A method, comprising:
moving a first half of a modular service interface toward a second half of the modular service interface, the modular service interface comprising:
one or more alignment features;
a connector interface, comprising a first portion connector interface in the first half and a second portion connector interface in the second half; and
one or more electropermanent magnet modules, configured to mate the first and second halves when activated and allow the first and second halves to be separated when inactivated;
arresting motion of the second half of the modular service interface, and in response:
engaging the one or more alignment features with corresponding receiving features;
coupling the first portion connector interface to the second portion connector interface;
observing the first half and second half of the modular service interface in direct contact and in response:
initially activating, by a control circuit, the one or more electropermanent magnet modules to mate the first and second halves; and
maintaining mating between the first half and the second half of the modular service interface without mechanical actuation.

12. The method of claim 11, wherein in response to activating the one or more electropermanent magnet modules to mate the first and second halves, the method further comprising:
providing power through the one or more alignment features, wherein the one or more alignment features comprises a plurality of alignment posts and the one or more receiving features comprises one or more receiving holes.

13. The method of claim 11, wherein activating the one or more electropermanent magnet modules to mate the first and second halves comprising:
providing a high current pulse through conductive windings of the electropermanent magnet modules for a predetermined time period.

14. The method of claim 13 further comprising:
maintaining mating between the first and second halves indefinitely in response to providing no pulses through conductive windings of the electropermanent magnet modules.

15. The method of claim 11, wherein in response to activating the one or more electropermanent magnet modules, the method further comprising:
deactivating the one or more electropermanent magnet modules; and
unmating the first and second halves.

16. The method of claim 15, wherein deactivating the one or more electropermanent magnet modules comprising:
pulsing each electropermanent magnet module with a series of magnetization pulses of opposite successive polarity and decreasing amplitude.

17. The method of claim 11, wherein in response to the first half mated to the second half, the method further comprising one or more of:
providing, by the connector interface, data communications between the first and second halves;
transferring, by the connector interface, one of low pressure or high pressure fluids between the first and second halves;
transferring, by the connector interface, a torque force between the first and second halves; or
providing, by the connector interface, a separation force between the first and second halves.

18. The method of claim 11, further comprising:
providing thermal conduction, by surfaces between the first and second halves when mated,
wherein the connector interface is centrally disposed within and configured to be removable from the modular service interface.

19. The method of claim 18, wherein the surfaces providing thermal conduction comprising one of a large array of carbon nanotubes perpendicularly disposed to the surfaces or an elastomeric thermal gap filler material.

20. A modular service interface, comprising:
a passive section, comprising:
a plurality of alignment receivers;
a receiver for a centrally disposed first portion of a connector interface;
one or more ferromagnetic face sheet sections; and
an active section, configured to selectively mate and unmate with the passive section, comprising:
a plurality of alignment posts, extending away from opposite edges of the active section in a parallel fashion and configured to provide DC power and ground connections to the plurality of alignment receivers;
a receiver for a centrally disposed second portion of the connector interface, the second portion of the connector interface configured to mate with the first portion as the passive section mates with the active section; and
one or more electropermanent magnet modules, each comprising a plurality of solid state switchable magnets, disposed peripherally around the connector interface, configured to mate the active and passive sections when activated and allow the active and passive sections to be separated when inactivated,
wherein the modular service interface comprises no mechanical actuators to retain the active section to the passive section.

\* \* \* \* \*